United States Patent
Kimoto et al.

[11] Patent Number: 5,579,442
[45] Date of Patent: Nov. 26, 1996

[54] ADAPTIVE KINEMATIC CONTROL APPARATUS

[75] Inventors: Takashi Kimoto; Daiki Masumoto; Hiroshi Yamakawa; Shigemi Nagata, all of Kawasaki, Japan

[73] Assignee: Fujitsu Limited, Kawasaki, Japan

[21] Appl. No.: 233,423

[22] Filed: Apr. 28, 1994

[30] Foreign Application Priority Data

Apr. 30, 1993 [JP] Japan .................................. 5-104173

[51] Int. Cl.$^6$ .................................................. G05B 19/04
[52] U.S. Cl. ................................ 395/81; 395/80; 395/86; 395/96; 901/9; 901/15; 364/165; 318/368.11
[58] Field of Search ............................... 395/80, 81, 86, 395/96; 901/9, 15; 364/165; 318/568.11

[56] References Cited

U.S. PATENT DOCUMENTS

| | | | |
|---|---|---|---|
| 4,874,963 | 10/1989 | Alspector | 307/20 |
| 4,990,838 | 2/1991 | Kawato et al. | 318/568.1 |
| 5,276,771 | 1/1994 | Manukian et al. | 395/24 |
| 5,294,873 | 3/1994 | Seraji | 318/568.1 |

OTHER PUBLICATIONS

Craig, "Intro to Robotics . . . ," Addison Wesly, 1989, pp. 353–358.
Azhar, et al, "Adaptive Control . . . " Euromicro workshop, 1992, pp. 351–358.
Wilhelmsen, et al "Neural Network . . . " 1990 IEEE Conf. pp. III-407 to III-413.

*Primary Examiner*—Robert W. Downs
*Assistant Examiner*—A. Katbab
*Attorney, Agent, or Firm*—Staas & Halsey

[57] ABSTRACT

A network is provided in which the direct model of the controlled target is learned, and an actuation amount for realizing a target control amount is generated using this network in accordance with the relaxation algorithm. A recognizing network and a prediction network are provided, wherein the recognition result of the recognizing network is input to the prediction network, and the prediction result of the predicting network is fed back to the recognizing network. Moreover, the predicting network is utilized so as to generate a command relating to the motion in accordance with the relaxation algorithm.

7 Claims, 21 Drawing Sheets

$$f(x_i) = \frac{1}{1-e^{-x_i}}$$

$$x_i = \sum_l y_l w_{li}$$

$$y_i = \frac{1}{1-e^{-\sum_j y_j w_{ji}}}$$

ADAPTIVE KINEMATIC CONTROL APPARATUS

BACKGROUND OF THE INVENTION

The present invention generally relates to control apparatuses capable of determining an actuation amount required in controlling a control amount of a controlled object to match a target control amount, and to active sensing apparatuses in which recognition and actuation are performed in a parallel and coordinated manner. More particularly, the present invention relates to a control apparatus which is capable of easily determining an actuation amount with respect to a highly redundant controlled target or a nonlinear controlled target, and to an active sensing apparatus in which the improvement in recognition accuracy and in recognition speed is achieved.

In a control system, there is a process for determining an actuation amount, fed to the controlled target, which is necessary to control the control amount of the controlled target to match a target value. It is necessary that the determination of the actuation amount be done easily with respect to the highly redundant controlled target or the nonlinear controlled target.

Recently, an active sensing method, whereby recognition and action are performed in a parallel and coordinated manner, has drawn attention. In order to make the active sensing method a practical method, it is required that a construction be built whereby the improvement in recognition accuracy and in recognition speed is achieved.

First, a description will be given of a conventional control system.

FIG. 1 is a block diagram showing a generally used feedback control system according to a conventional automatic control theory.

The controlled target in the figure may be an object, a process, a robot or an industrial apparatuses. A detecting part translates the control amount of the controlled target into an appropriate feedback amount that can be compared with the target value. A difference calculator calculates the difference between the feedback amount output from the detecting part and the target value so as to obtain a control deviation. A controlling part generates an actuating signal on the basis of the control deviation calculated by the difference calculator. An actuating part converts an actuating signal generated by the controlling part into the activation amount to be fed to the controlled target.

In a conventional feedback control system having such a construction, the control amount of the controlled target is controlled to match the target value in the following manner: the detecting part detects the control amount of the controlled target and translates the same into the feedback amount; the difference calculating part obtains the control deviation by calculating the difference between the feedback amount and the target value; the controlling part translates the control deviation into the actuating signal; and the actuating part determines the actuation amount to be fed to the controlled target on the basis of the actuating signal so that there is no control deviation. In accordance with this control process, the control amount match the target value with a high precision without being affected by outside influences.

A description will be given of a case in which the above described conventional feedback control technology is applied to the control of a manipulator of a robot. The manipulator control is performed such that the arm tip of the manipulator is controlled to be at a target position by controlling joint angles.

FIG. 2 is a block diagram showing the manipulator control performed when inverse kinematic calculations of the manipulator are performed. An inverse kinematic problem is a problem in which the joint angle and the joint speed for realizing given conditions including the position, orientation and speed of the manipulator. In this case, an inverse kinematic calculation mechanism is provided before a servo-system so that the inverse kinematic calculation mechanism translates a target command relating to the position/orientation of the arm tip into a command relating to the joint angle, thereby effecting a feedback control of the manipulator on the basis of the deviation which takes place between the translated command relating to the joint angle and the observed joint angle.

Since the manipulator currently used in the industry employs a structure in which the inverse kinematic problem can be solved, the control system according to the construction of FIG. 2 is employed therein. The manipulator control as shown in FIG. 3 is employed in the manipulator having a complex structure in which there is no solution to the inverse kinematic problem. In this method, the direct kinematic calculation mechanism translates the joint angle of the manipulator into the position and orientation in the coordinate representation. The deviation which takes place between the command relating to the position/orientation and the observed/translated position and orientation is obtained, whereupon the deviation with respect to the joint angle is generated by applying inverse Jacobian matrix calculations on the obtained deviation, thereby enabling command relating to the angle of each joint of the manipulator to be obtained.

A description will now be given of a conventional sensing technology, and the active sensing technology that has recently come to draw attention.

Generally, a sensing technology is a technology in which the observed target is recognized such that a sensor output indicative of the characteristic of the observed target is obtained by observing the target by means of a detecting part of a visual sensor or the like, a reference is made to the existing knowledge at a recognizing part, and a comparison is made, also at the recognizing part, between the sensor output and the characteristic amount of the observed target. FIG. 4 explains the sensing technology capable of image recognition.

For example, in the field of computer vision, which is extensively studied recently, a two-dimensional image is obtained from a three-dimensional world (observed target) by means of a visual sensor such as a television camera. The sensing of the observed target is reduced to a problem of deducing the state of the three-dimensional world (scene) on the basis of the two-dimensional image. Since the input image is affected by a variety of factors including the camera position, the state of lighting and the configuration/reflectance/relative arrangement of the observed target(s), the characteristic of the scene is deduced by solving an inverse problem of converting the two-dimensional image to the three-dimensional image, wherein the computer is allowed to learn in advance how the observed target will look. However, the inverse problem of converting the two-dimensional image to the three-dimensional image has an infinite number of solutions. In other words, it is a problem characterized by an improper setting in which the unique solution cannot be obtained. Accordingly, the recognition is conventionally performed by assuming a specific lighting condition or a specific reflectance of the object.

With this limitation of the conventional sensing technology as a background, the active sensing technology, in which the sensing of the observed target is executed while a sensor is moved, has come to be studied.

FIG. 5 is a block diagram explaining the active sensing technology. In the active sensing technology, the recognition is not regarded as an isolated task. Instead, recognition and action are executed in a parallel and coordinated manner so as to improve the recognition precision. The sensing is performed such that a sensory perception goal is provided, and an operation for realizing the sensing which achieves that goal is performed. For example, the operation of searching for the target object or the operation of grasping the entire picture of the target object is performed.

FIG. 6 shows an example of how the active sensing technology is realized. In this example, an arm having multiple degrees of freedom is used as a manipulator for executing a measurement action, and a hand camera is used as a visual sensor. In this construction, it is intended that the recognition precision with respect to the observed target is improved by performing a measurement action with respect to the observed target captured by the visual sensor, the measurement action including a searching action, a grasping of the entire picture and a close observation of unclear parts. FIG. 7 is a block diagram explaining the active sensing technology realized in the manner shown in FIG. 6.

According to the conventional feedback control system shown in FIG. 2, there is a need to provide an inverse kinematic calculation mechanism. However, an analytical resolution of an inverse kinematic problem is impossible to obtain in some controlled targets. Hence, there is a problem that a limitation is imposed on the structure of the controlled target. For example, there is a problem that the manipulator is limited to only certain types of structure. There is also a problem in that an inverse kinematic solution is impossible to obtain when there is a redundancy in the degree of freedom of the controlled target or when the controlled target has a nonlinearity.

According to the conventional feedback control system shown in FIG. 3, there is a need to perform inverse Jacobian matrix calculations. Since these inverse matrix calculations consume a large amount of processing time, there is problem that improvement in the speed of control is impossible to achieve. There is also a problem that there are singularities in which an inverse matrix cannot be obtained analytically.

According to the conventional active sensing technology, the algorithm of the measurement action is realized on the basis of human observation of the target and on the basis of human knowledge of the target. In actuality, the algorithm is based on the assumption that the actuator is used only as part of the sensing operation. Hence, the recognition accuracy is not satisfactory. Only the variation, generated by the measurement action, of the sensor signal relating to the observed target is reflected in the sensing, and no element of predictive control is included. Hence, there is a problem of slow recognition.

SUMMARY OF THE INVENTION

Accordingly, it is an object of the present invention to provide a novel control apparatus in which an actuation amount required in controlling a control amount of a controlled target to match a target control amount, and in which the actuation amount can be easily determined even with respect to a highly redundant controlled target or a nonlinear controlled target, and to provide a novel active sensing apparatus which is capable of active sensing whereby recognition and action are performed in a parallel and coordinated manner, and in which the improvement in recognition accuracy and in recognition speed is realized.

Another and more specific object of the present invention is to provide a control apparatus by which an actuation amount required in controlling a control amount of a controlled object to match a target control amount is determined, the control apparatus comprising:

a converting part which is constructed to map the correspondence between an actuation amount indicated by the controlled target and a control amount, and which receives an input of the actuation amount so as to output a control amount corresponding to the input;

a calculating part which, when an initial actuation amount is input to the converting part, calculates a corrective actuation amount corresponding to the initial actuation amount and allowing the target control amount to match the control amount output from the converting part, on the basis of a difference between the target control amount and the control amount output from the converting part; and an outputting part which outputs a sum of the initial actuation amount and the corrective actuation amount calculated by the calculating part, as the actuation amount to be fed to the controlled target.

According to the control apparatus of the present invention, it is possible to determine an actuation amount that realizes a target control amount without using inverse kinematic calculations or inverse Jacobian matrix calculations. Hence, it is possible to determine the actuation amount without applying any restrictive condition to the controlled object, and to easily determine the actuation amount with respect to a high-redundant controlled object or a nonlinear controlled object.

Still another and more specific object of the present invention is to provide an active sensing apparatus applied to an observation system which system comprises: a detecting part for detecting observation sensing information by observing an object; and an actuating part for driving the detecting part on the basis of operational command information, the active sensing apparatus comprising:

a recognition part which maps the correspondence between the state information of the observed target and the observation sensing information detected by the detecting part, receives an input of the state information of the observed target, and outputs the observation sensing information corresponding to the input;

a first calculating part which, when the state information is input to the recognizing part, calculates new state information that allows the observation sensing information output from the recognizing part to match the observation sensing information detected by the detecting part, on the basis of difference information between the observation sensing information output from the recognizing part and the observation sensing information detected by the detecting part;

a predicting part which is constructed to map the correspondence between the state information of the observed target/the operational command information for the actuating part, and the state information of the observed target updated in accordance with the operational command information, receives inputs of the state information calculated by the first calculating part and the operational command information for the actuating part, and outputs the state information of the observed target which information corresponds to the input; and a second calculating part which, when the state information/operational command information are input to the predicting part, calculates new operational command information that allows the state information output from the prediction part to match the target object information, on the basis of the difference information between the state information output from the prediction part and the target state information, and which updates the operational command information for the actuating part, wherein the state information output from the predicting part is input to the recognizing part.

According to the active sensing apparatus of the present invention, there are included a detecting part for detecting the observation sensing information by observing an object and an actuating part for driving the detecting part in accordance with the operational command information. In realizing active sensing whereby recognition and action are performed in a parallel and coordinated manner, actions for realizing the obtaining of the target recognition result are generated while the prediction information for predicting the recognition result occurring as a result of an action is taken advantage of. Hence, it is possible to improve the recognition rate and the speed of recognition.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

Figure 1:
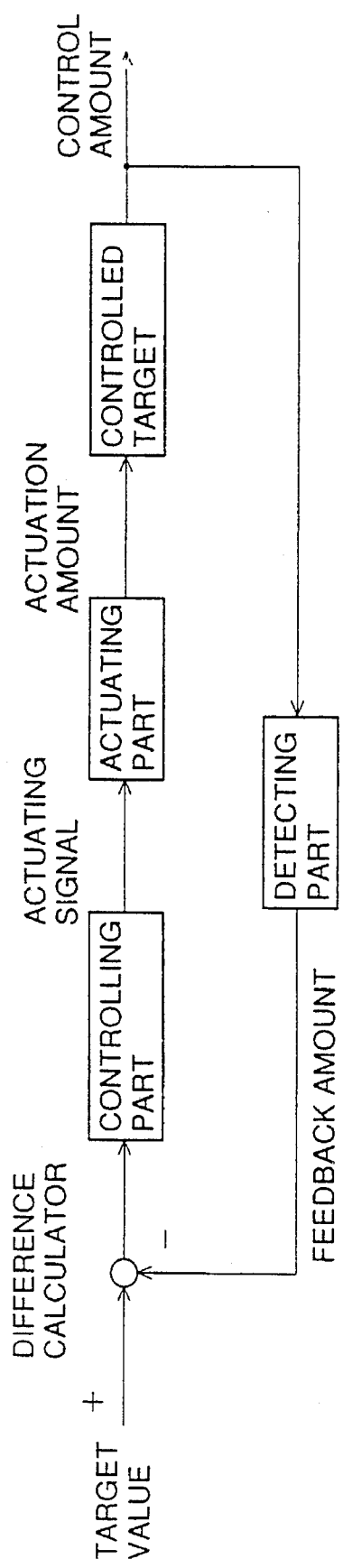
FIG. 1 is a block diagram showing the construction of a feedback control system.
Figure 2:
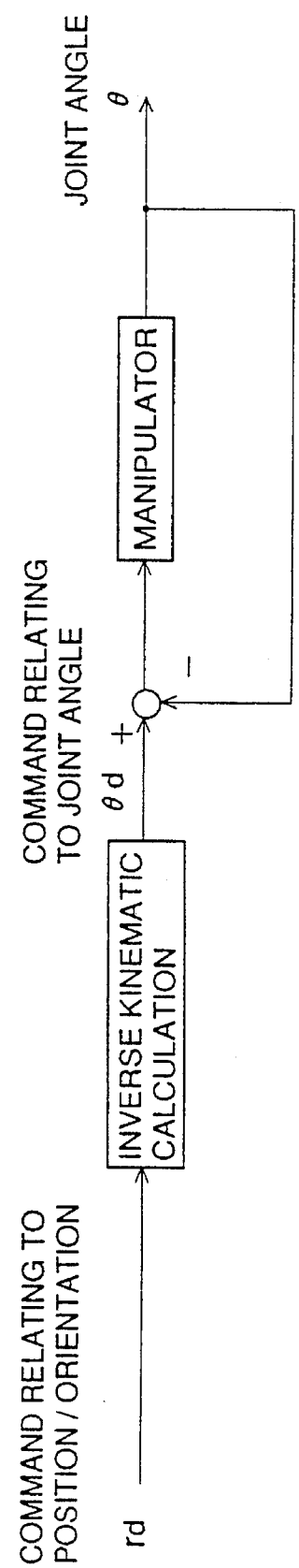
FIG. 2 is a block diagram explaining a feedback control system in which inverse kinematic calculations are used.
Figure 3:
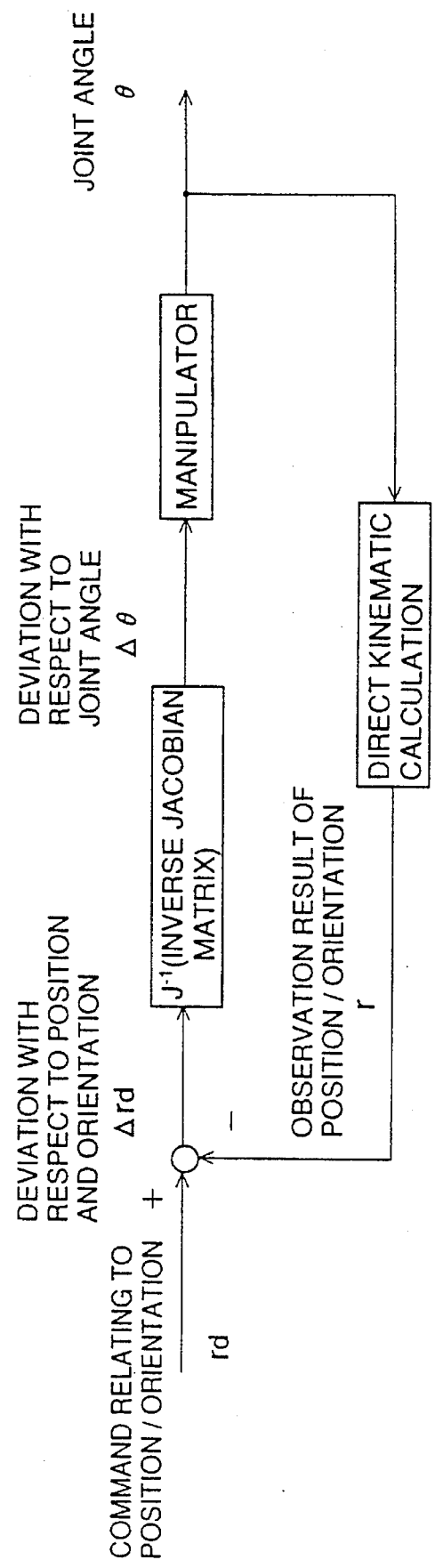
FIG. 3 is a block diagram explaining a feedback control system in which inverse Jacobian matrix calculations are used.
Figure 4:
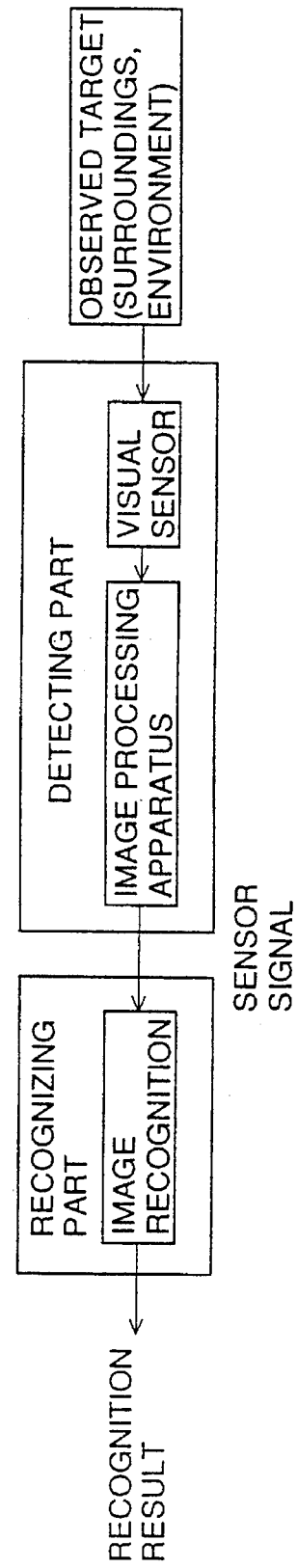
FIG. 4 is a diagram explaining a conventional sensing technology.
Figure 5:
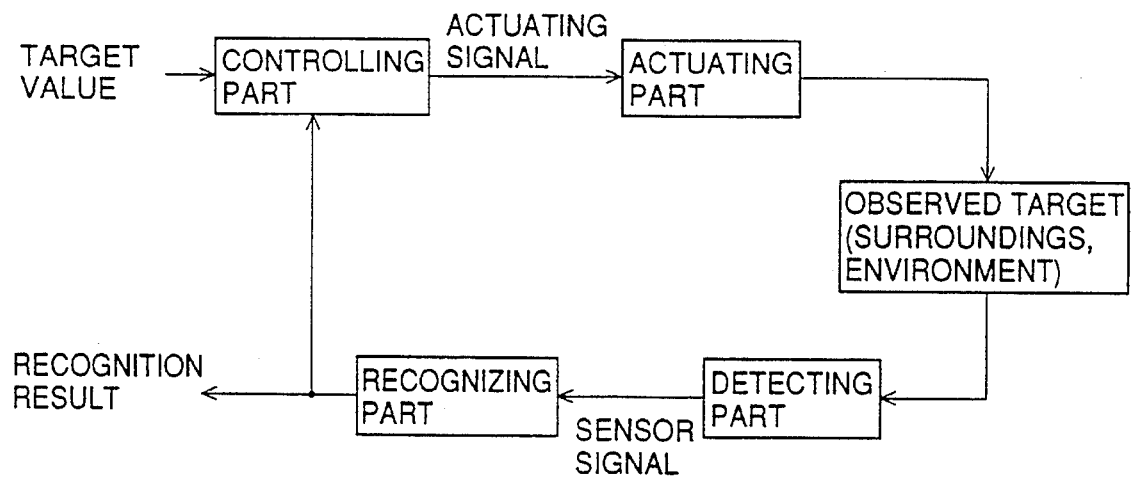
FIG. 5 is a diagram explaining an active sensing technology.
Figure 6:
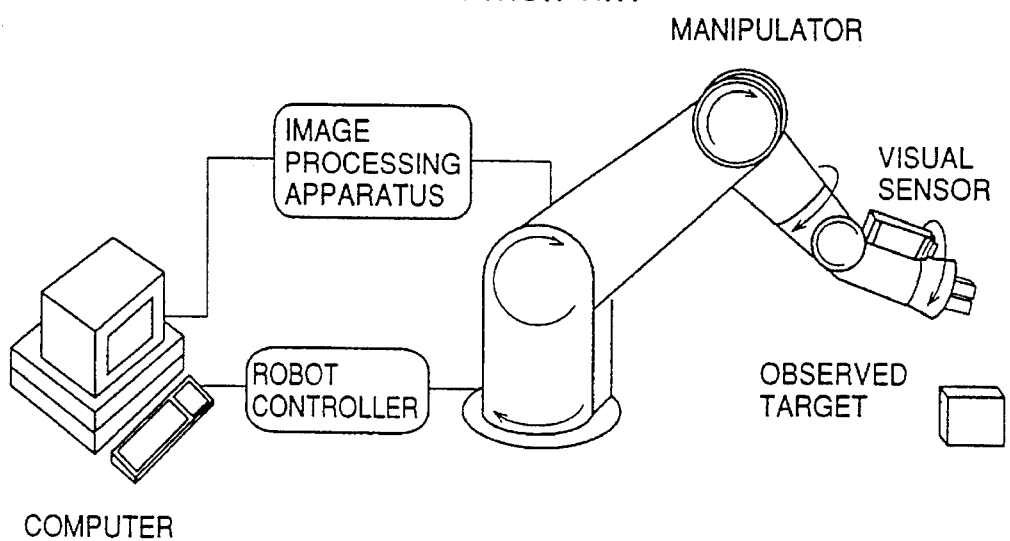
FIG. 6 is a diagram explaining the active sensing technology.
Figure 7:
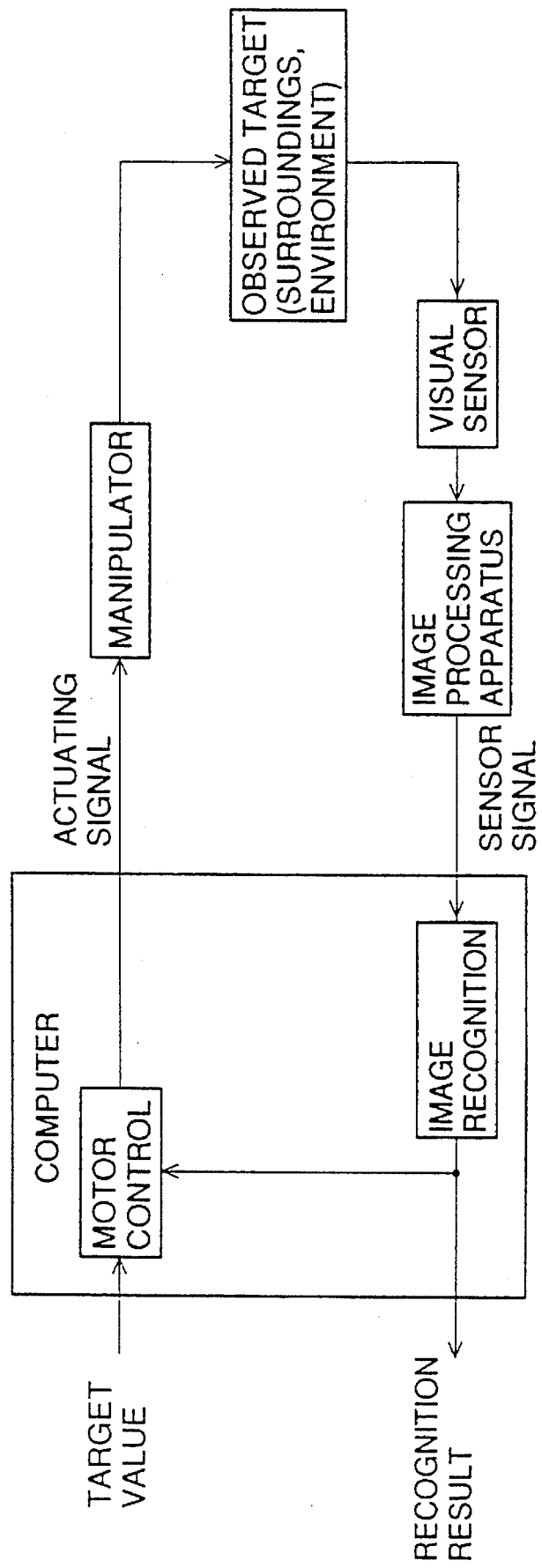
FIG. 7 is a diagram explaining the active sensing technology.
Figure 8:
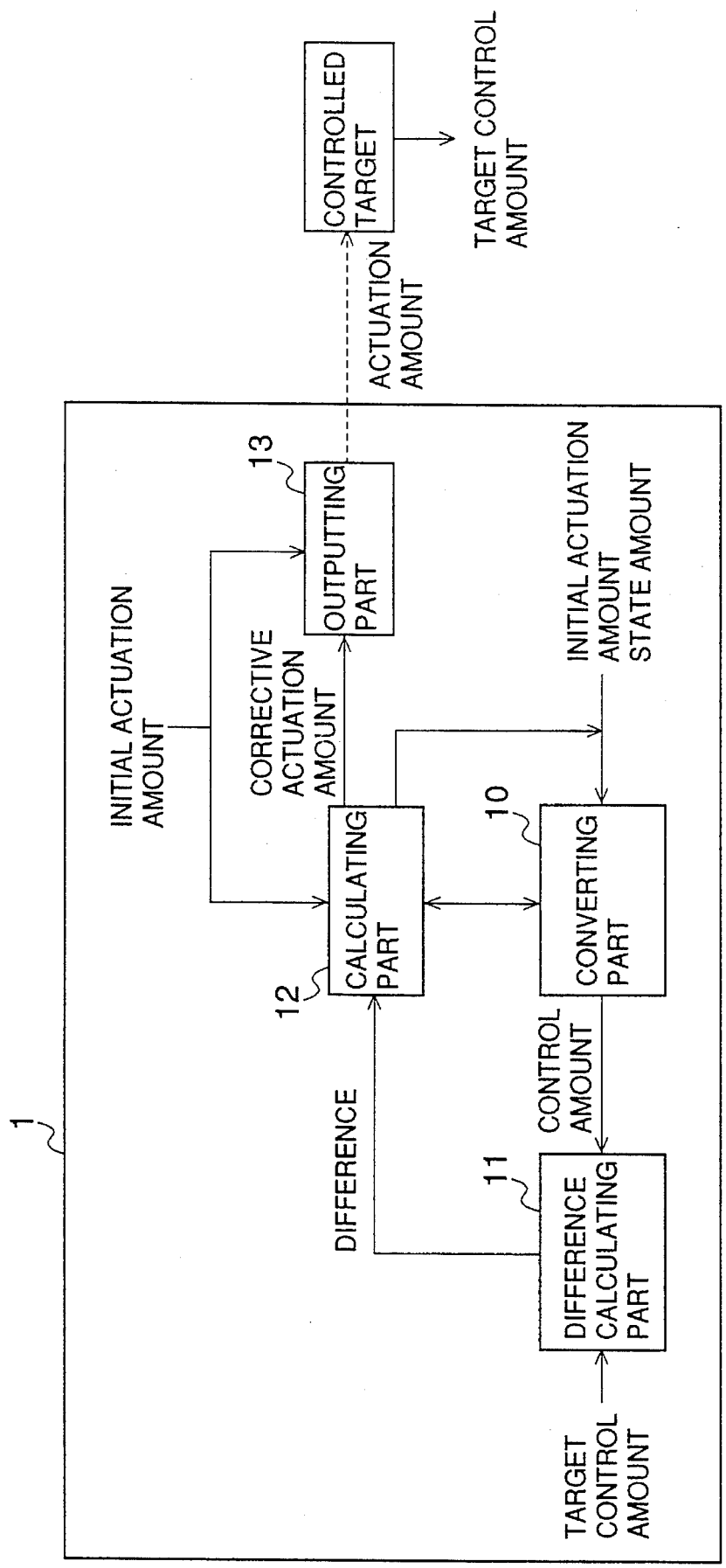
FIG. 8 is a diagram showing the construction of the present invention.
Figure 9:
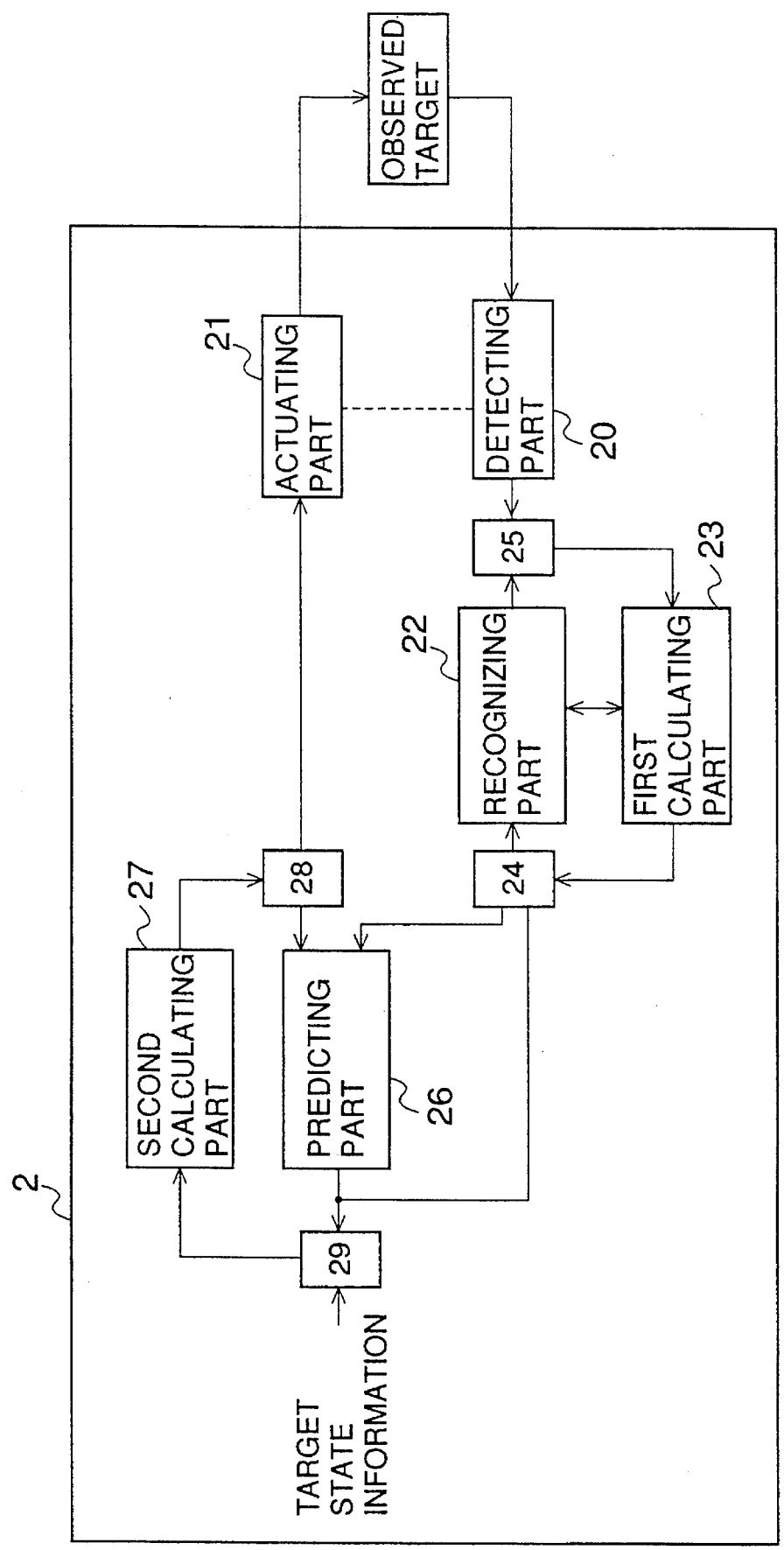
FIG. 9 is a diagram showing the construction of the present invention.

FIG. 8 shows the construction of a control apparatus of the present invention; and FIG. 9 shows the construction of an active sensing apparatus of the present invention.

In FIG. 8, 1 indicates a control apparatus of the present invention, which apparatus determines an actuation amount required in controlling a control amount of a controlled target to match a target control amount, and outputs the determined actuation amount to the controlled target.

The control apparatus 1 of the present invention includes a converting part 10, a difference calculating part 11, a calculating part 12 and an outputting part 13.

The converting part 10 is constructed of, for example, a neural network. The converting part 10 either employs a construction which maps the correspondence between the actuation amount indicated by the controlled target and the control amount, and which receives an input of the actuation amount and outputs the control amount corresponding to the input, or employs a construction which maps the correspondence between the actuation amount and the state amount indicated by the controlled target, and the control amount, and which receives an input of the actuation amount and the state amount and outputs the control amount corresponding to the input. The difference calculating part 11 calculates the difference between the target control amount and the control amount output from the converting part 10. The calculating part 12 calculates the corrective actuation amount with respect to an initial actuation amount input to the converting part 10. The outputting part 13 outputs the actuation amount for realizing the target control amount, to the controlled target.

In FIG. 9, 2 indicates an active sensing apparatus of the present invention, which apparatus realizes an active sensing whereby recognition and action are performed in a parallel and coordinated manner, by comprising a detecting part 20 for detecting observation sensing information by observing the target, and an actuating part 21 for actuating the detecting part 20 in accordance with operational command information.

The active sensing apparatus 2 comprises a recognizing part 22, a first calculating part 23, a first latch part 24, a first difference calculating part 25, a predicting part 26, a second calculating part 27, a second latch part 28 and a second difference calculating part 29.

The recognizing part 22 is constructed of a neural network and employs a construction which maps the correspondence between state information relating to the observed target and observation sensing information detected by the detecting part 20. The recognizing part 22 receives an input of the state information relating to the observed target and outputs the observation sensing information corresponding to the input. The first calculating part 23 calculates new state information with respect to the state information input to the recognizing part 22. The first latch part 24 latches the state information input to the recognizing part 22 and latches the new state information calculated by the first calculating part 23. The first difference calculating part 25 calculates the difference between the observation sensing information output from the recognizing part 22 and the observation sensing information detected by the detecting part 20.

The predicting part 26 is constructed of, for example, a neural network, and employs a construction which maps the correspondence between the state information relating to the observed target/operational command information fed to the actuating part 21, and the state information relating to the observed target and updated in accordance with the operational command information. The predicting part 26 receives an input of the state information calculated by the first calculating part 23 and the operational command information fed to the actuating part 21, and outputs the state information relating to the observed target and corresponding to the input. The second calculating part 27 calculates new operational command information with respect to the operational command information fed to the input of the predicting part 26. The second latch part 28 latches the operational command information calculated by the second calculating part 27. The second difference calculating part 29 calculates the difference between target state information relating to the observed target and the state information relating to the observed target and output from the predicting part 26.

In this construction, the state information output from the predicting part 26 is allowed to be input to the recognizing part 22.

According to the control apparatus 1 of the present invention, the converting part 10, upon receipt of the initial actuation amount, outputs the control amount in accordance with the mapped data correspondence. Upon receipt of the control amount, the difference calculating part 11 calculates the difference between the target control amount and the control amount output from the converting part 10. Upon receipt of the calculated difference, the calculating part 12 calculates, in accordance with, for example, a relaxation algorithm, the corrective actuation amount with respect to the initial actuation amount so that the target control amount and the control amount output from the converting part 10 match. Upon receipt of the corrective actuation amount, the outputting part 13 outputs a sum of the initial actuation amount input to the converting part 10 and the corrective actuation amount calculated by the calculating part 12 as an actuation amount to be applied to the controlled target.

In making a calculation, the calculating part 12 may calculate the corrective actuation amount while applying a restriction amount to a part or all of a plurality of types of actuation amount input to the converting part 10. When the corrective actuation amount that allows the target control amount to match the control amount output from the converting part 10 is not obtained, the corrective actuation amount (pseudo corrective actuation amount) which is permitted when the restriction amount is applied may be employed as the corrective actuation amount. When the outputting part 13 outputs the actuation amount on the basis of the pseudo corrective actuation amount, it is desirable that the actuation amount which was previously output from the outputting part 13 be used as the initial actuation amount input to the converting part 10. It is to be noted that the calculating part 12 may include a part of a plurality of types of actuation amount input to the converting part 10 in the calculation of the corrective actuation amount.

As has been described, according to the control apparatus 1 of the present invention, it is possible to determine the actuation amount for realizing the target control amount, without using inverse kinematic calculations or inverse Jacobian matrix calculations. Therefore, it is possible to determine the actuation amount without applying a restrictive condition to the controlled target. It is also possible to determine the actuation amount easily with respect to the highly redundant controlled target or the nonlinear controlled target.

In the active sensing apparatus 2 of the present invention, when the state information relating to the observed target is provided via the first latch part 24 (or when the initial information is provided), the recognizing part 22 outputs the observation sensing information in accordance with the mapped data correspondence. Upon receipt of the output from the recognizing part 22, the first difference calculating part 25 the difference between the observation sensing information output from the recognizing part 22 and the observation sensing information output from the detecting part 20. Upon the receipt of the difference, the first calculating part 23 calculates, in accordance with, for example, the relaxation algorithm, the new state information so that the observation sensing information output from the recognizing part 22 and the observation sensing information detected by the detecting part 20 match. In accordance with the new state information, the state information latched in the first latch part 24 is updated and input to the predicting part 26.

Upon receipt of the state information calculated by the first calculating part 23 and upon receipt, via the second latch part 28, of the initial operational command information fed to the actuating part 21, the predicting part 26 outputs the new state information relating to the observed target in accordance with the mapped data correspondence, the new state information serving as prediction information. Upon receipt of the new state information, the second difference calculating part 29 calculates the difference between the target state information relating to the observed target and the state information output from the predicting part 26. Upon receipt of the difference, the second calculating part 27 calculates, in accordance with, for example, the relaxation algorithm, the new operational command information so that the target state information relating to the observed target and the state information output from the predicting part 26 match. In accordance with the operational command information, the operational command information latched in the second latch part 28 is updated and output to the actuation part 21. The state information input to the recognizing part 22 is updated by setting the state information output from the predicting part 26 in the first latch part 24.

In making a calculation, the second calculating part 27 may calculate the new operational command information while applying a restriction information to a part or all of a plurality of types of operational command information input to the predicting part 26. The restrictive condition represented by, for example, the restriction information functions such that, when the operational command information that allows the target state information to match the state information output from the predicting part 26 is not obtained, the operational command information (pseudo operational command information) which is permitted when the restriction condition is applied may be employed as the calculated operational command information. When the operational command information is output to the actuating part 21 in accordance with the pseudo operational command information, it is desirable that the operational command information which was previously used by the second calculating part 27 be used as the initial operational command information input to the predicting part 26.

It is to be noted that the first calculating part 23 may include a part of a plurality of types of operational command information input to the recognizing part 22 in the calculation of the state information. It is also to be noted that the second calculating part 27 may include a part of a plurality of operational command information input to the predicting part 26 in the calculation of the operational command information.

As has been described, according to the active sensing apparatus 2 of the present invention, a construction is employed which includes the detecting part 20 for detecting the observation sensing information by observing the target, and the actuating part 21 for driving the detecting part 20 in accordance with the operational command information. The active sensing apparatus 2 is also constructed such that, when active sensing whereby recognition and action are performed in a parallel and coordinated manner is realized in the active sensing apparatus 2, the action that obtains the target recognition result is generated while the prediction information for predicting the recognition result occurring as a result of an action is utilized, is generated. Hence, the improvement in recognition accuracy and improvement in recognition speed are achieved.

A detailed description will now be given of the embodiments of the present invention.

First, an embodiment of the control apparatus 1 of the present invention will be described.

Figure 10:
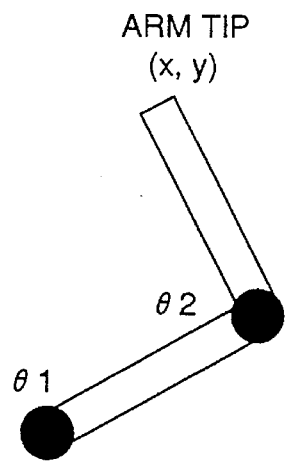
FIG. 10 is a diagram showing a manipulator which is a controlled target.

FIG. 10 shows a manipulator, which is a controlled target of the control apparatus 1 in this embodiment. In the manipulator shown in FIG. 10, two joint angles $\Theta_1$ and $\Theta_2$ are designated as actuation amounts, and the arm tip position (x, y) is designated as a control amount. The control apparatus 1 for controlling the manipulator is configured such that, given the initial actuation amounts in the form of the current joint angles $\Theta_1$ and $\Theta_2$, the command value relating to the joint angle required to move the arm tip to a desired target position is determined.

Figure 11:
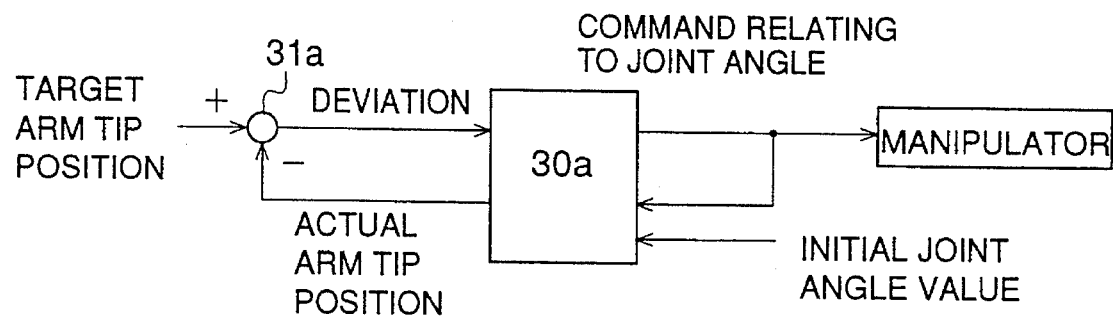
FIG. 11 is a diagram explaining the construction of an embodiment of a control apparatus.

FIG. 11 shows an example of the construction of the control apparatus 1 for controlling the manipulator of FIG. 10. The construction of FIG. 11 includes: a data translating mechanism 30a which receives the input of the initial joint angle value, and which determines the command value relating to the joint angle; and a calculating mechanism 31a for calculating the deviation of the actual arm tip position with respect to the target arm tip position, which deviation is required by the data translating mechanism 30a. When the command value relating to the joint angle for enabling the arm tip to move to the target arm tip position in one operation cannot be obtained due to the restriction resulting from the manipulator mechanism or the like, the joint angles specified by the command value relating to the joint angle determined within the range defined by the restriction are newly input as the initial joint angle values to the data translating mechanism 30a. It is also possible to feed back the joint angles of the manipulator directly.

Figure 12:
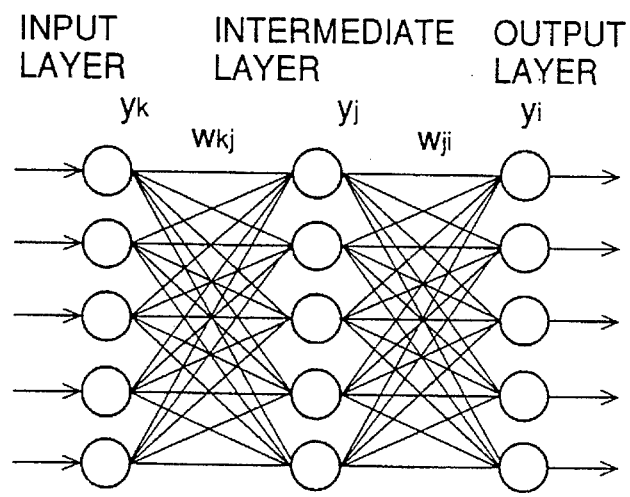
FIG. 12 is a diagram showing an example of a data translating mechanism.

FIG. 12 shows an example of the data translating mechanism 30a. The data translating mechanism 30a of this example comprises a neural network consisting of an input layer formed of a plurality of input units for distributing input values unaltered as output values, an intermediate layer formed of a plurality of basic units which receives the output value $(y_k)$ from the input layer and an allocated weighting value $(w_{kj})$, applies a predetermined calculation on these values, and outputs the calculation result, and an output layer (output value is $y_i$) formed of a plurality of basic units which receives the output value $(y_j)$ from the intermediate layer and an allocated weighting value $(w_{ji})$, applies a predetermined calculation on these values, and outputs the calculation result.

Figure 13:
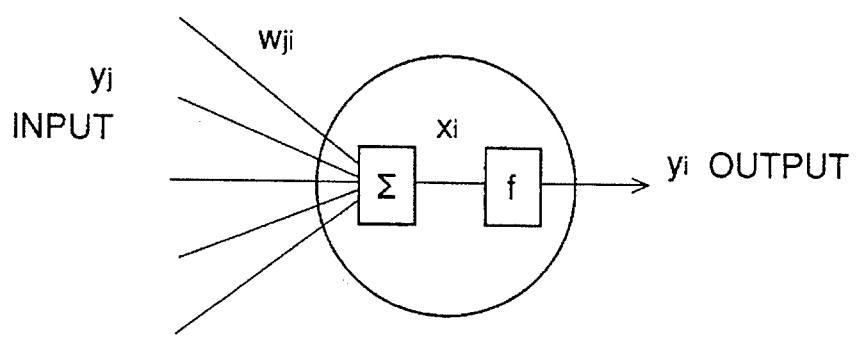
FIG. 13 is a diagram explaining the calculation process of a basic unit.
Figure 14:
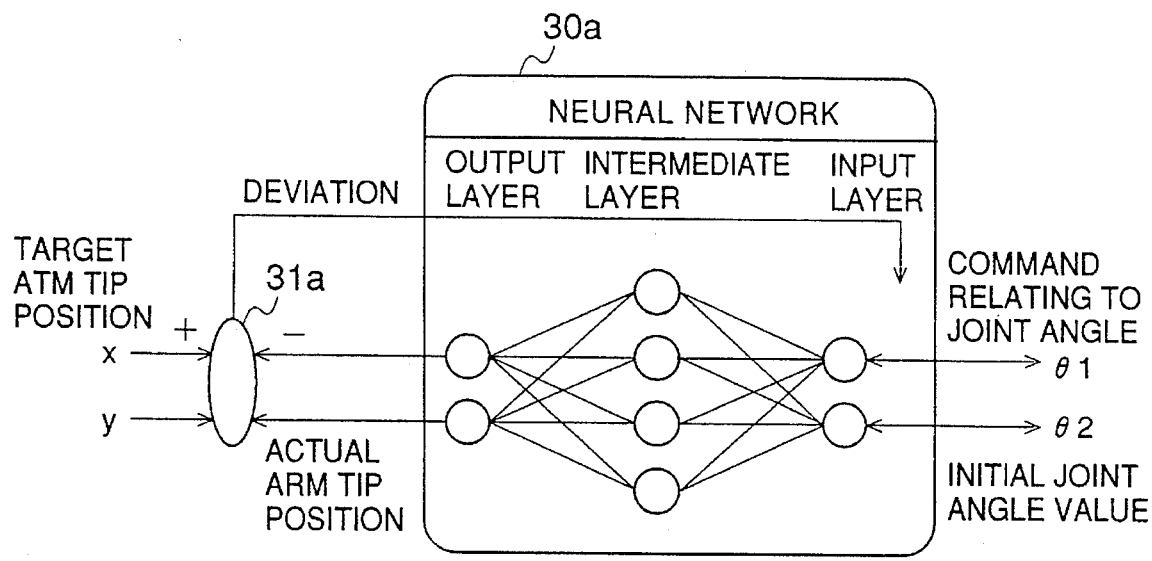
FIG. 14 is a diagram showing an example of a data translating mechanism.

A description will be given of a basic unit which forms the intermediate layer and the output layer. The basic unit which forms the intermediate layer is taken as an example. Referring to FIG. 13, the basic unit calculates the disjunction $x_i$ of the input value and the weighting value, and determines the output value by applying a translation process $f(x_i)$ to the disjunction. As shown in FIG. 14, when the manipulator of FIG. 10 is to be controlled, the number of input units in the input layer of the data translating mechanism 30a is two in correspondence with the fact that there are two kinds of actuation amount. The number of basic units in the output layer is two in correspondence with the fact that the target arm tip position is given two-dimensionally.

The weighting value of the neural network of the data translating mechanism 30a is learned in advance so that the moving characteristic of the manipulator is mapped. Specifically, the actuation amounts in the form of various join angles $\Theta_1$ and $\Theta_2$ are fed to the manipulator, whereupon the learning signal is generated by collecting the arm tip positions corresponding to the actuation amounts. The process of learning the weight is performed in accordance with the well-known error backpropagation method so that, when the learning signal is fed as the joint angle to the input layer of the neural network, the corresponding arm tip position is output from the output layer.

A description will now be given of a relaxation algorithm.

The relaxation algorithm is an algorithm for obtaining a corrective value for the input value, which corrective value decreases the error function E between the output value output from the data translating mechanism 30a and the target value of the output value.

The corrective value for the input value is obtained by gradient descent. Specifically, the updating difference $y_k$ of the input value of the input unit is $$\Delta y_k = -\epsilon \frac{\partial E}{\partial y_k} = -\epsilon \delta_k \quad (1)$$

The error difference $\delta_k$ in the equation (1) is sequentially derived, starting from the output layer, as in the case of error backpropagation.

The error difference $\delta_i$ with respect to the output value $y_i$ of the output layer is $$\delta_i = \frac{\partial E}{\partial y_i} \tag{2}$$

The error difference $\delta_j$ with respect to the output value $y_j$ of the intermediate layer is $$\begin{aligned}\delta_j &= \sum_i \frac{\partial E}{\partial y_i} \frac{\partial y_i}{\partial y_j} \\ &= \sum_i \frac{\partial E}{\partial y_i} \frac{\partial f(x_i)}{\partial y_j} \\ &= \sum_i \frac{\partial E}{\partial y_i} \frac{\partial f(x_i)}{\partial x_i} \frac{\partial x_i}{\partial y_j} \end{aligned} \tag{3}$$

Since there is a following relationship as shown in FIG. 13, $$x_i = \sum_i y_i w_{ij}, \tag{4}$$

the equation (3) for obtaining the error difference $\delta_j$ with respect to the output value $y_j$ of the intermediate layer becomes $$\begin{aligned}\delta_j &= \sum_i \frac{\partial E}{\partial y_i} \frac{\partial f(x_i)}{\partial x_i} \frac{\partial \sum_i y_i w_{ij}}{\partial y_j} \\ &= \sum_i \delta_i f'(x_i) w_{ji}\end{aligned} \tag{5}$$

The error difference $\delta_k$ with respect to the output value $y_k$ of the input layer is obtained in the same manner as per the following equation $$\begin{aligned}\delta_k &= \sum_i \delta_i f'(x_j) w_{jk} \\ &= \sum_i \left( \sum_i \delta_i f'(x_i) w_{ji} \right) f'(x_j) w_{jk}\end{aligned} \tag{6}$$

When the error function E is $$E = \frac{1}{2} \sum_i (d_i - y_i)^2, \tag{7}$$

the error difference $\delta_i$ with respect to the output value $y_i$ of the output layer is $$\delta_i = \frac{\partial E}{\partial y_i} = y_i - d_i \tag{8}$$

By performing sequential calculations starting from the output layer toward the input layer in accordance with the equations (5) and (6), the error difference $\delta_k$ with respect to the output value $y_k$ of the input layer can be calculated. By substituting the value of $\delta_k$ in the equation (1), the updating difference $\Delta y_k$ of the input value of the input layer can be obtained.

If the translation process $f(x_i)$ of the basic unit is a following sigmoid function as shown in FIG. 13, $$f(x) = \frac{1}{1 - e^{-x}}, \tag{9}$$

the derivative thereof is $$f'(x_i) = f(x_i)(1 - f(x_i)) = y_i(1 - y_i) \tag{10}$$

Hence, the derivative terms of the equations (5) and (6) can be easily calculated.

Figure 15:
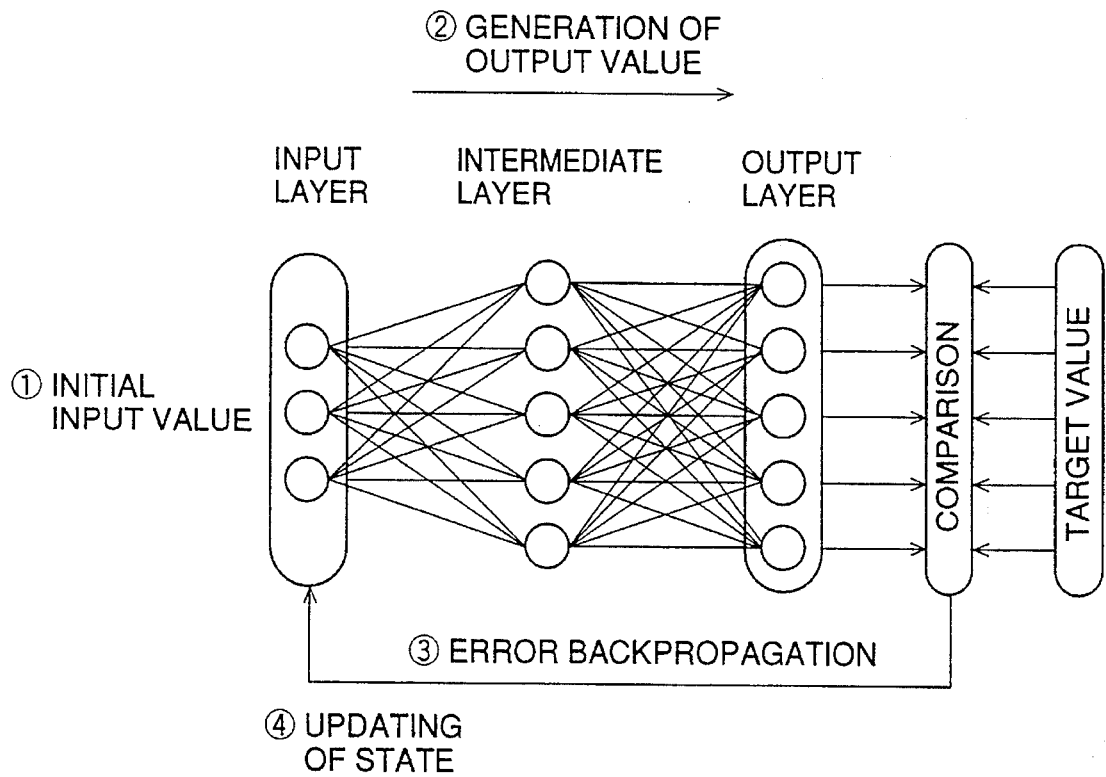
FIG. 15 is a diagram explaining the relaxation algorithm.

As described above, the relaxation algorithm allows the error to be backpropagated from the output layer to the input layer as shown in FIG. 15, so as to obtain the updating difference $\Delta y_k$ of the input value $y_k$ of the input layer, by which difference the error of the output value of the output layer is decreased.

Figure 16:
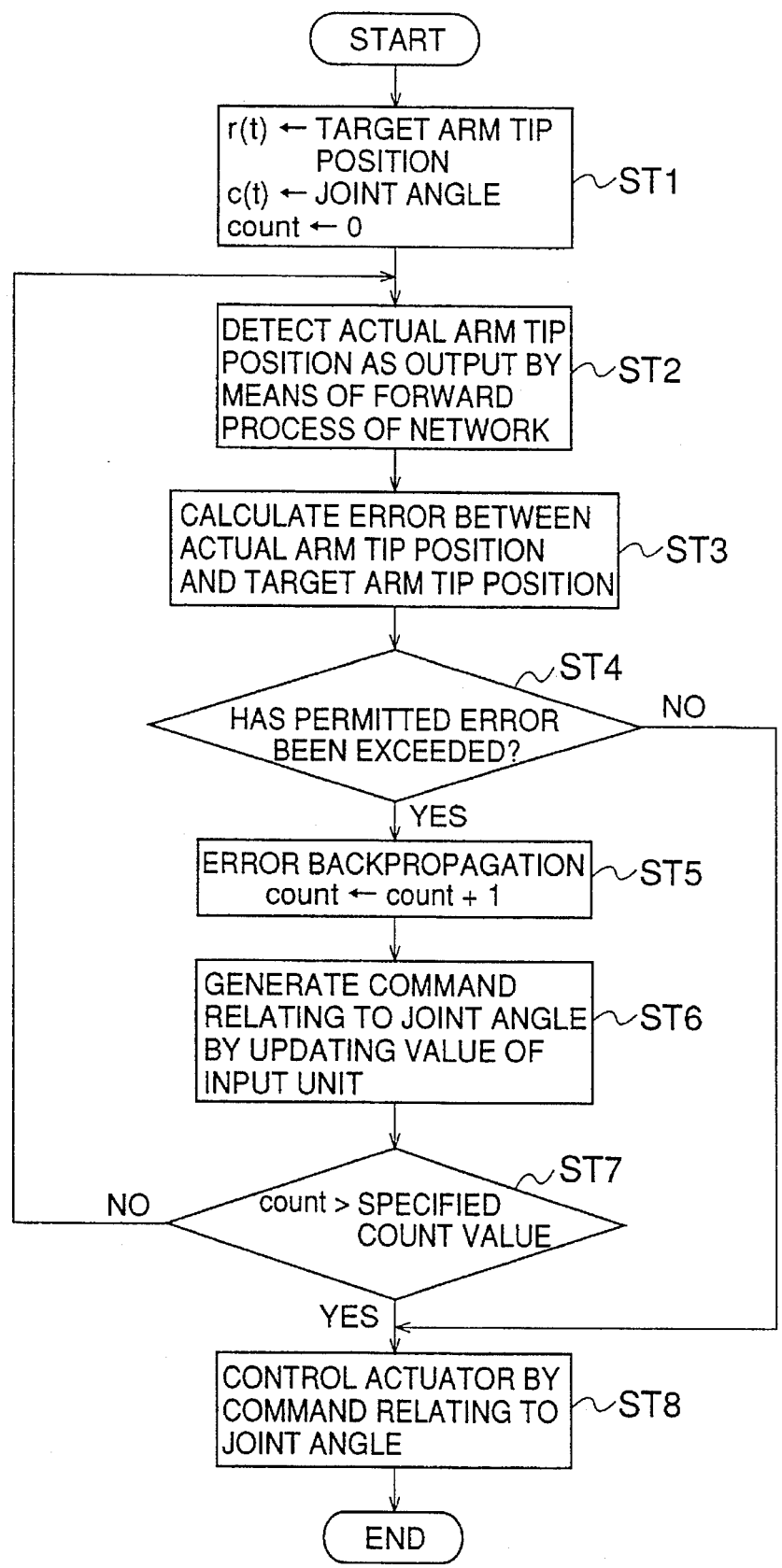
FIG. 16 is a flowchart showing an example of the process flow executed by the control apparatus.

Given the current joint angles $\Theta_1$ and $\Theta_2$ of the manipulator, the control apparatus 1 for controlling the manipulator of FIG. 10 determines the command value relating to the joint angle required to move the arm tip to a desired target position, by using the relaxation algorithm. FIG. 16 shows an example of the process flow executed by the control apparatus 1.

A description will next be given of this process flow.

As indicated in this process flow, the control apparatus 1 determines the command value relating to the joint angle for enabling the arm tip to come to the target position such that, in step 1, the control apparatus 1 first sets the target position of the arm tip in a variable r(t), sets the current joint angles $\Theta_1$ and $\Theta_2$ in a variable c(t), and sets zero in a variable "count". In step 2, the control apparatus 1 obtains, from the output layer, an actual arm tip position corresponding to the joint angles, by inputting the joint angle value set in the variable c(t) in the input layer of the neural network of the data translation mechanism 30a.

In step 3, the control apparatus 1 calculates the error (the deviation) between the actual arm tip position and the target arm tip position, by activating the calculating mechanism 31a. Thereafter, in step 4, the control apparatus 1 makes a determination as to whether or not the calculated error exceeds the permitted error. When it is determined that the calculated error exceeds the permitted error, the process proceeds to step 5, in which the above-mentioned relaxation algorithm is executed so that the updating difference of the joint angles for decreasing the error can be calculated, and in which the value of the variable "count" is incremented.

Thereafter, in step 6, the control apparatus 1 generates the command value relating to the joint angle by adding the joint angle value set in the variable c(t) to the updating difference of the joint angle calculated in step 5. The generated command value relating to the joint angle is set in the variable c(t). Thereafter, in step 7, a determination is made as to whether or not the value of the variable "count" has exceeded a specified count value. When it is determined that it has not been exceeded, the process returns to step 2, in which the command value relating to the joint angle, which value allows the error between the actual arm tip position output from the data translation mechanism 30a and the target arm tip position to be smaller the permitted error, is obtained by executing the relaxation algorithm repeatedly.

When it is determined in step 4 that the error between the actual arm tip position output from the data translating mechanism 30a and the target arm tip position is smaller than the permitted error, the process proceeds to step 8, in which the arm tip of the manipulator is allowed to move to the target position by controlling the actuator for controlling the joint angle of the manipulator in accordance with the command value relating to the joint angle.

When it is determined in step 7 that the value of the variable "count" has exceeded the specified count value, the process proceeds to step 8 in which the actuator for controlling the joint angle of the manipulator is controlled in accordance with the generated command value relating to the joint angle. Since the arm tip of the manipulator does not move to the target position in this case, the execution of the process flow of FIG. 9 is started over. When the current joint angles $\Theta_1$ and $\Theta_2$ are set in the variable c(t) in step 1 in this case, the joint angles may not be obtained by direct measurement but they may be determined on the basis of the previous command value relating to the joint angle.

As has been described, when the control apparatus 1 of the present invention is used to control the manipulator of FIG. 10, the command value relating to the joint angle required to move the arm tip of the manipulator to a desired target position can be determined without executing inverse kinematic calculations or inverse Jacobian matrix calculations, given the current joint angles $\Theta_1$ and $\Theta_2$ as the initial actuation amounts.

A description will next be given of another embodiment of the control apparatus 1 of the present invention.

Figure 17:
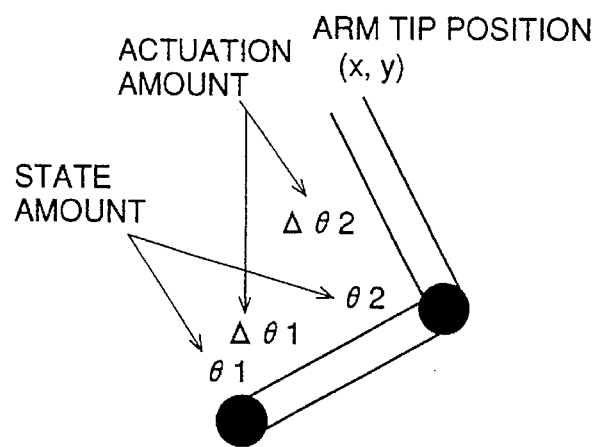
FIG. 17 is a diagram explaining a manipulator which is a controlled target.

FIG. 17 shows the manipulator which is controlled by the control apparatus 1 of this embodiment. In this illustrated manipulator, the two joint angles $\Theta_1$ and $\Theta_2$ are designated as state amounts, the deviations $\Delta\Theta_1$ and $\Delta\Theta_2$ of the two joint angles $\Theta_1$ and $\Theta_2$ are designated as actuation amounts, and the arm pit position (x, y) is designated as a control amount. In the control apparatus 1 of this embodiment which controls this manipulator shown, the current joint angles $\Theta_1$ and $\Theta_2$ are provided as initial state amounts, and the command value relating to the joint angle deviation required to move the arm tip to a desired target position is determined, given the initial command value relating to the joint angle.

Figure 18:
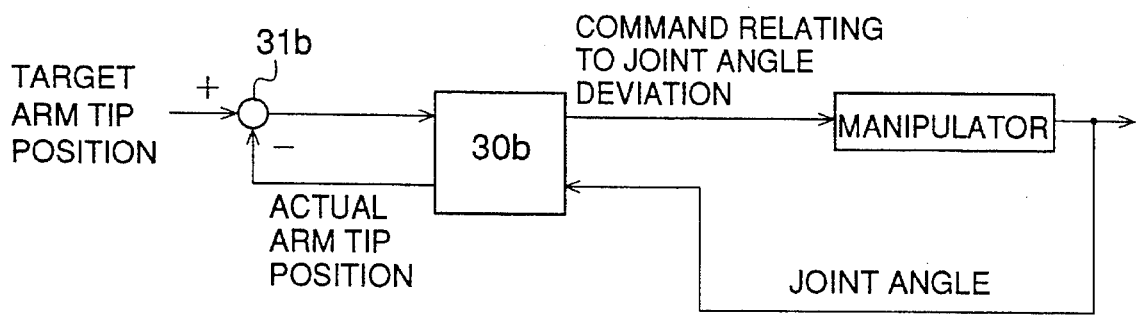
FIG. 18 is a diagram showing an example of the construction of the control apparatus.

FIG. 18 shows an example of the construction of the control apparatus 1 which controls the manipulator of FIG. 17. The control apparatus 1 of this embodiment comprises: a data translation mechanism 30b which receives the input of a current joint angle value/an initial command value relating to the joint angle, and determines the command value relating to the joint angle deviation; a calculating mechanism 31b for calculating the deviation of the actual arm tip position from the target arm tip position, which deviation is required by the data translating mechanism 30b. When the command value relating to the joint angle deviation for enabling the arm tip to move to the target arm tip position in one operation cannot be obtained due to the restriction resulting from the manipulator mechanism or the like, the joint angles specified, for movement of the arm tip, by the command value relating to the joint angle deviation determined within the range defined by the restriction are newly input the data translating mechanism 30b.

Figure 19:
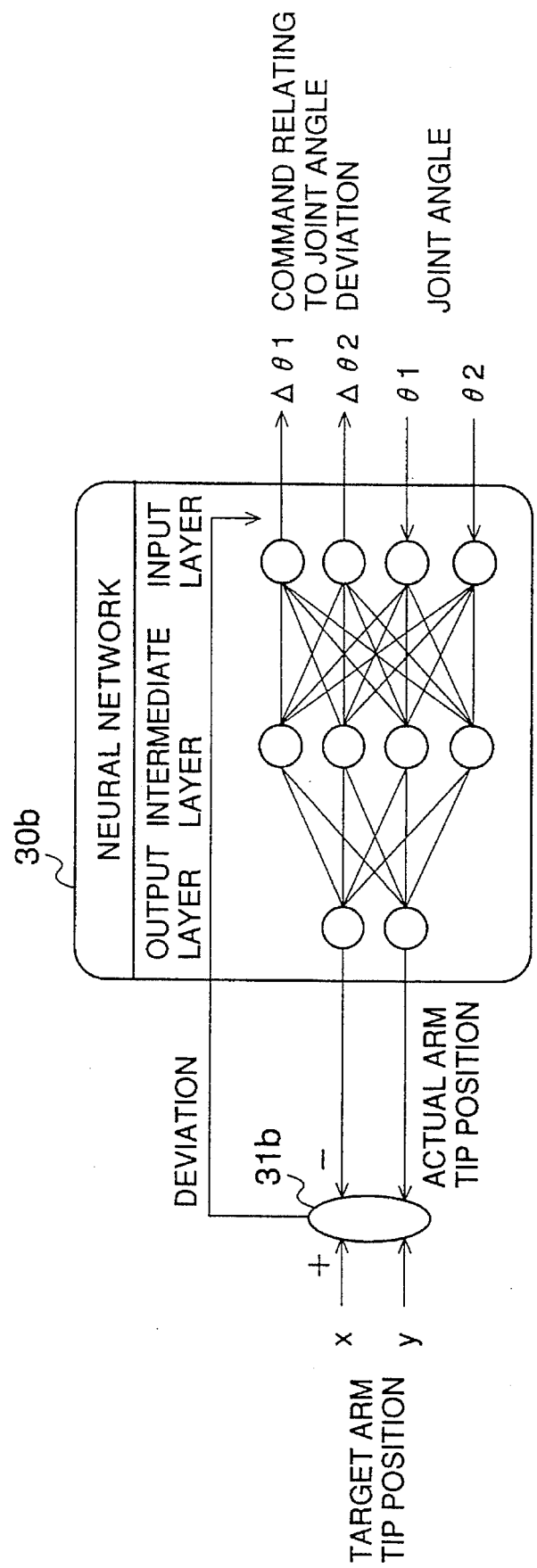
FIG. 19 is a diagram showing an example of the data translating mechanism.

The data translating mechanism 30b may be formed by a neural network as in the case of the data translating mechanism 30a shown in FIG. 12. When the neural network is employed, the number of input units in the input layer is four in correspondence with the fact that there are two kinds of actuation amount and two kinds of state amount, as shown in FIG. 19. The number of basic units in the output layer is two in correspondence with the fact that the arm tip position is determined two-dimensionally.

The weighting value of the neural network of the data translating mechanism 30b is learned in advance so that the operational characteristic of the manipulator is mapped. Specifically, the actuation amounts in the form of various command values relating to the joint angle deviation are fed to the manipulator, given various joint angles $\Theta_1$ and $\Theta_2$, whereupon the learning signal is generated by collecting the arm tip positions corresponding to the actuation amounts. The process of learning the weight is performed in accordance with the well-known backpropagation method so that, when the learning signal is fed, as the joint angle/command value relating to joint angle deviation, to the input layer of the neural network, the corresponding arm tip position is output from the output layer.

The control apparatus 1 for controlling the manipulator of FIG. 17 determines, by using the aforementioned relaxation algorithm, the command value relating to the joint angle deviation required to move the arm tip to the desired target position, given the current joint angles $\Theta_1$ and $\Theta_2$ and the initial command value relating to the joint angle deviation.

Figure 20:
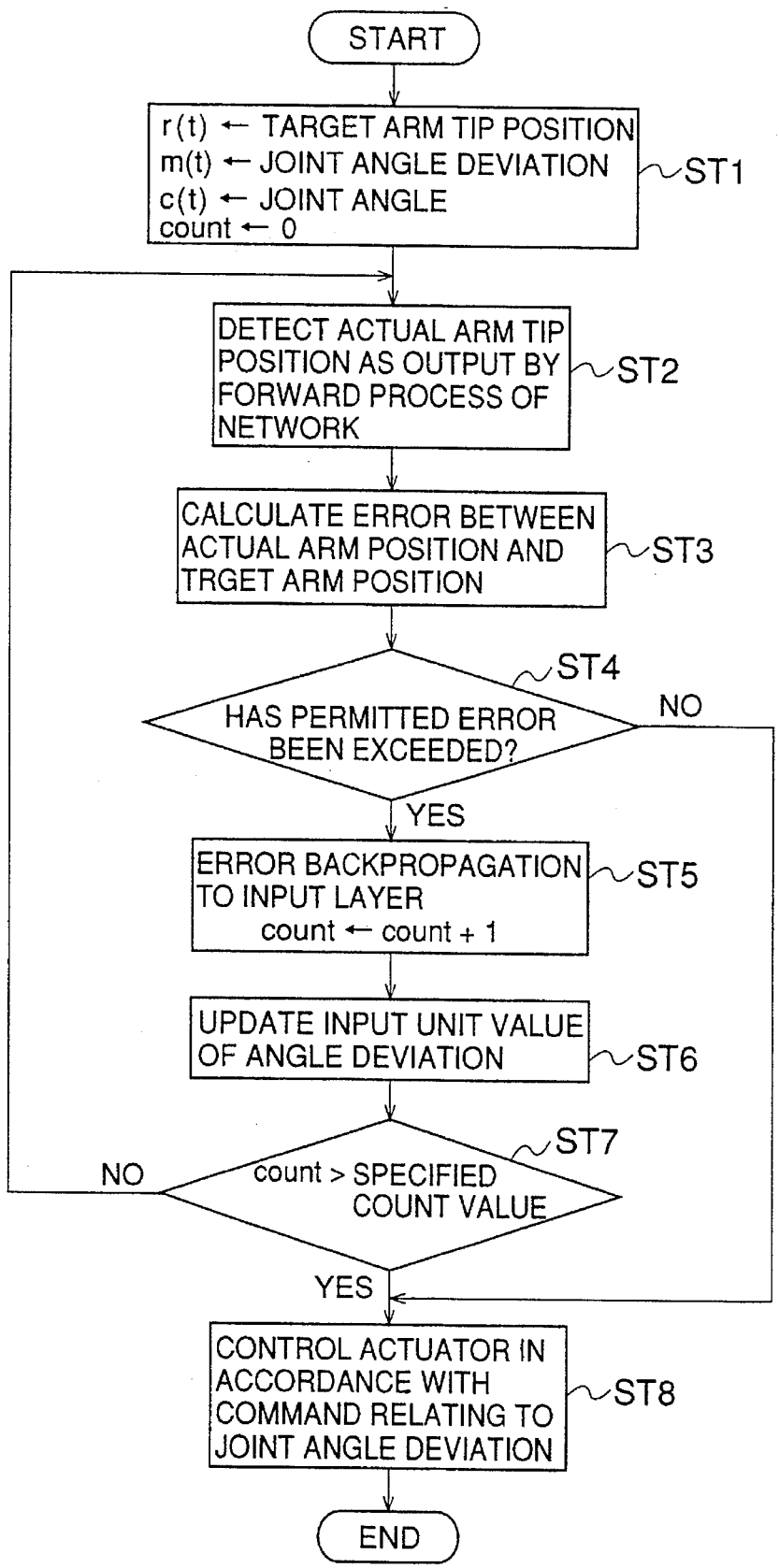
FIG. 20 is a flowchart showing an example of the process flow executed by the control apparatus.

FIG. 20 shows an example of process flow executed by the control apparatus 1.

A description will now be given of the process flow.

The control apparatus 1 determines the command value relating to the joint angle deviation required to move the arm tip to the target position such that, in step 1, the target position of the arm tip is set in the variable r(t), zero is set in a variable m(t) as an initial value of the command value relating to the joint angle deviation, the current joint angles $\Theta_1$ and $\Theta_2$ are set in the variable c(t), and zero is set in the variable "count". Thereafter, in step 2, the joint angle value set in the variable c(t) and the initial command value relating to the joint angle deviation set in the variable m(t) are fed to the input layer of the neural network of the data translation mechanism 30b, so that the actual arm tip position corresponding to the input can be obtained from the output layer.

Thereafter, in step 3, the error, i.e. the deviation of the actual arm tip position with respect to the target arm tip position is calculated by activating the calculating mechanism 31b. Thereafter, in step 4, a determination is made as to whether or not the calculated error exceeds the permitted error. When the permitted error is exceeded, the process proceeds to step 5, in which the updating difference of the command value relating to the joint angle deviation, which difference decreases the error, is calculated by executing the aforementioned relaxation algorithm, and the value of the variable "count" is incremented.

Thereafter, in step 6, the command value relating to the joint angle deviation is generated by adding the command value relating to the joint angle deviation set in the variable m(t) and the updating difference of the command value relating to the joint angle deviation calculated in step 5. The generated command value relating to the joint angle deviation is set in the variable m(t). Thereafter, in step 7, a determination is made as to whether or not the value of the variable "count" has exceeded the specified count value. When the specified count value has not been exceeded, the process returns to step 2, in which the command value relating to the joint angle deviation that allows the error between the actual arm tip position output from the data translating mechanism 31b and the target arm position to be smaller than the permitted error is obtained, by repeating the relaxation algorithm.

When it is determined in step 4 that the error between the actual arm tip position output from the data translation mechanism 30b and the target arm tip position is smaller than the permitted error, the process proceeds to step 8, in which the actuator for controlling the joint angle deviation of the manipulator is controlled in accordance with the generated value relating to the joint angle so that the arm tip of the manipulator is moved to the target position.

When it is determined in step 7 that the value of the variable "count" has exceeded the specified count value, the process proceeds to step 8, in which the actuator for controlling the joint angle deviation of the manipulator is controlled in accordance with the generated command value relating to the joint angle deviation. Since the arm tip of the manipulator is not moved to the target position, the execution of the process flow of FIG. 13 is started over. When the initial command value relating to the joint angle deviation is set in the variable m(t) in step 1 in this case, it is desirable that the previous command value relating to the joint angle deviation be used.

When the control apparatus 1 of this embodiment is used to control the manipulator of FIG. 17, it is possible to determine the command value relating to the joint angle deviation required to move the arm tip of the manipulator to the desired target position without executing inverse kinematic calculations or inverse Jacobian matrix calculations, given the current joint angles $\Theta_1$ and $\Theta_2$ of the manipulator and the initial command value relating to the joint angle deviation.

A description will next be given of an embodiment of the active sensing apparatus 2 of the present invention, by taking an example of an observation system in which the orientation of an object is recognized by means of a visual sensor.

Figure 21:
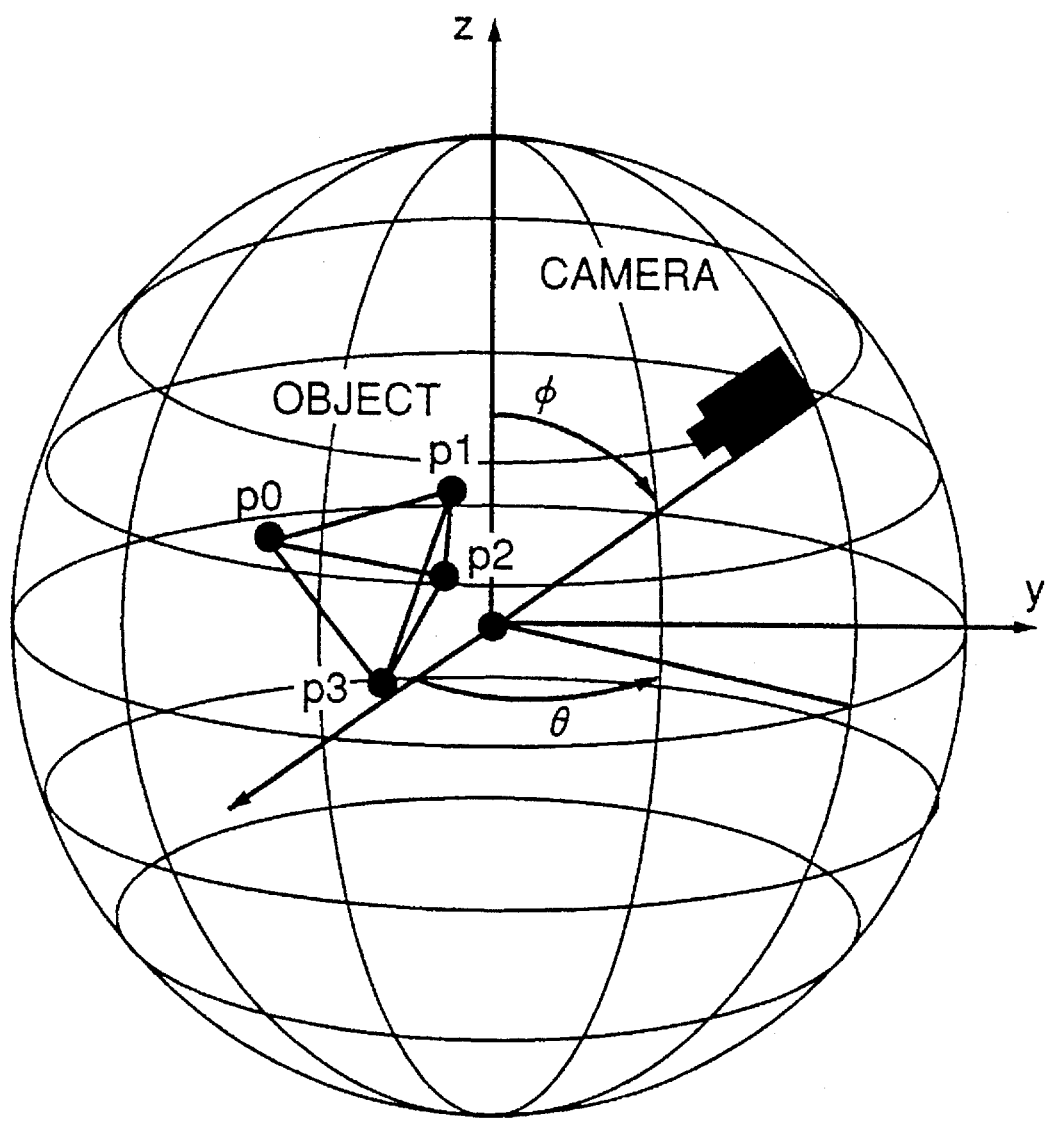
FIG. 21 is a diagram explaining an observation system.

An observation system in which observation of the object is done such that, given the orientation of the observed object, the visual sensor is moved and directed to the object having the given orientation. The position of the visual sensor is defined in the work coordinate representation, and the orientation of the observed object is defined in the object coordinate representation. As shown in FIG. 21, in this observation system, a television camera serving as the visual sensor is fitted to the tip of a bar which can be rotated around the original. The bar can be rotated by feeding a torque current $(\Theta_c, \phi_c)$ corresponding to the specified latitude and longitude to the actuator disposed at the original.

In order to realize this observation system, the active sensing apparatus 2 of the present invention needs to have a function of executing a control process for observing the object at a given orientation by moving the television camera based on the control of the torque current $(\Theta_c, \phi_c)$, given the orientation $(\Theta_o', \phi_o')$ of the observed object as the target value. It is assumed here that four markers are attached to the observed object so that the orientation of the object can be recognized.

Figure 22:
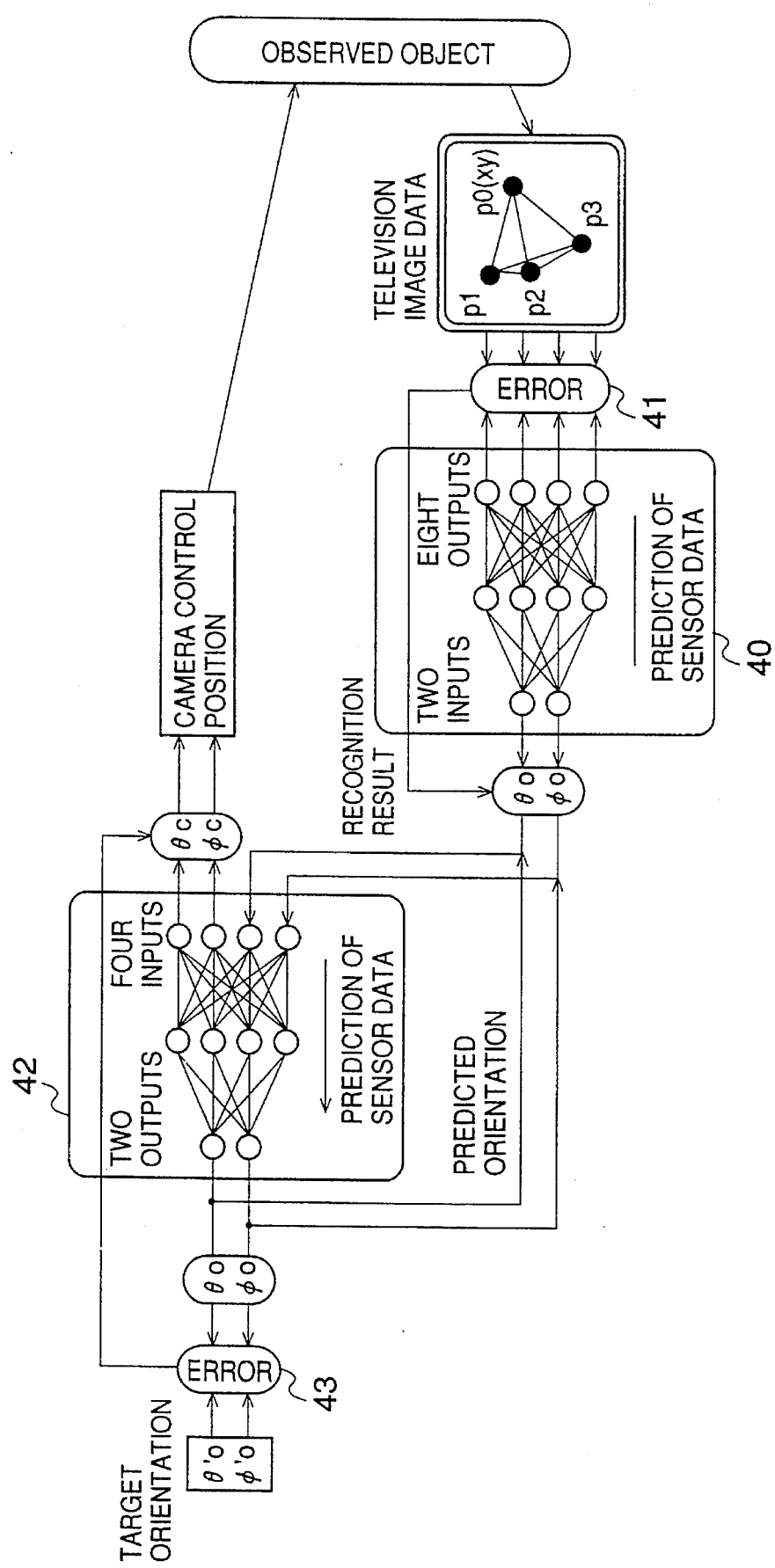
FIG. 22 is a diagram showing an example of the construction of an active sensing apparatus.

FIG. 22 shows an example of the construction of the active sensing apparatus 2 of the present invention which apparatus is applied to the above observation system.

In the figure, a recognition neural network 40 is formed of a neural network having two inputs and eight outputs. In the neural network 40, the input/output relationship between the orientation of the observed object and data relating to the television image of the four markers is used as a learning signal, and the learning of the weighting value takes place in advance so that the input/output relationship can be realized. When the orientation of the observed object is given, the data relating to the television image of the four markers corresponding to the orientation is output. As shown in the figure, the orientation of the observed object which is input to the recognition neural network 40 is indicated by $(\Theta_o, \phi_o)$.

The active sensing apparatus 2 is equipped with a mechanism for executing the aforementioned relaxation algorithm which is applied to the orientation of the observed object input to the recognition neural network 40, the executing mechanism being provided so as to correspond to the neural network 40. In accordance with the executing mechanism, the orientation of the observed object input to the recognition neural network 40 is updated so that the data, relating to the television image of the four markers output from the recognition neural network 40 and the data relating to the television image of the four markers actually shot by the television camera match.

An error calculating mechanism 41 calculates the difference between the data relating to the television image of the four markers output from the recognition neural network 40 and the data relating to the television image of the four markers actually shot by the television camera. The relaxation algorithm executing mechanism provided in correspondence with the recognition network 40 updates the orientation of the observed object input to the recognition neural network 40 so that the error calculated by the error calculating mechanism 41 becomes small.

Figure 23:
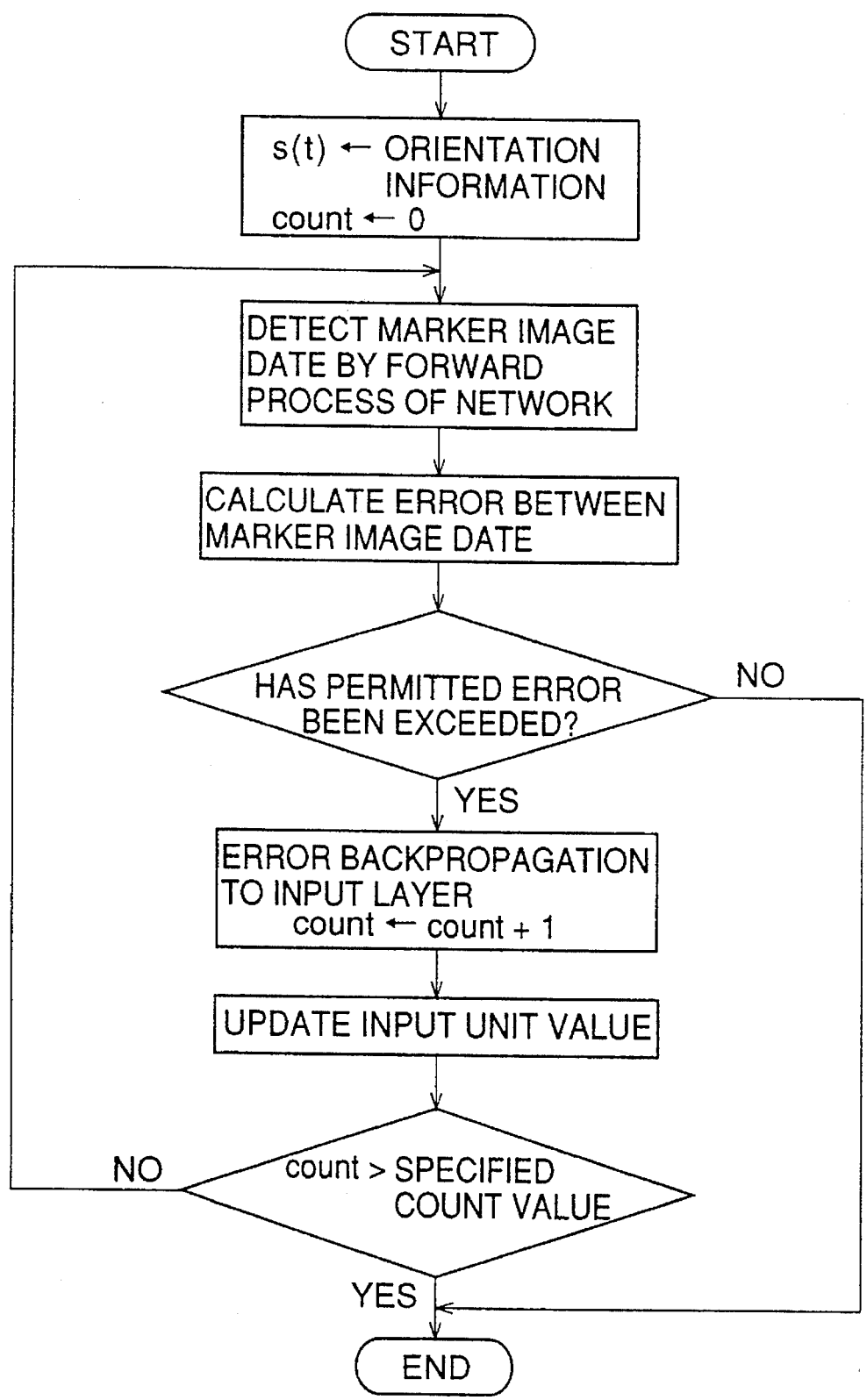
FIG. 23 is a flowchart showing an example of the process flow executed by the relaxation algorithm executing mechanism.

FIG. 23 shows an example of process flow executed by the relaxation algorithm executing mechanism. When the orientation information of the observed object is input to the recognition neural network 40, this mechanism obtains the error between the data relating to the television image of the four markers output from the recognition neural network 40 and the data relating to the television image of the four markers actually shot by the television camera. The relaxation algorithm is executed using the error thus obtained so as obtain the orientation of the observed object at which orientation the above becomes smaller than the permitted error.

A prediction neural network 42 is formed of a neural network having four inputs and two outputs. The orientation of the observed object and the torque current fed to the actuator are used as the presented input signal of the learning signal, and the orientation of the observed object which orientation varies according to the torque current is used as the presented output signal of the learning signal. In this arrangement, the learning of the weighting value is carried out so that the desired input/output relationship is realized. Given the orientation of the observed object output from the recognition neural network 40 and the torque current which is fed to the actuator, the corresponding orientation of the observed object is output.

Figure 24:
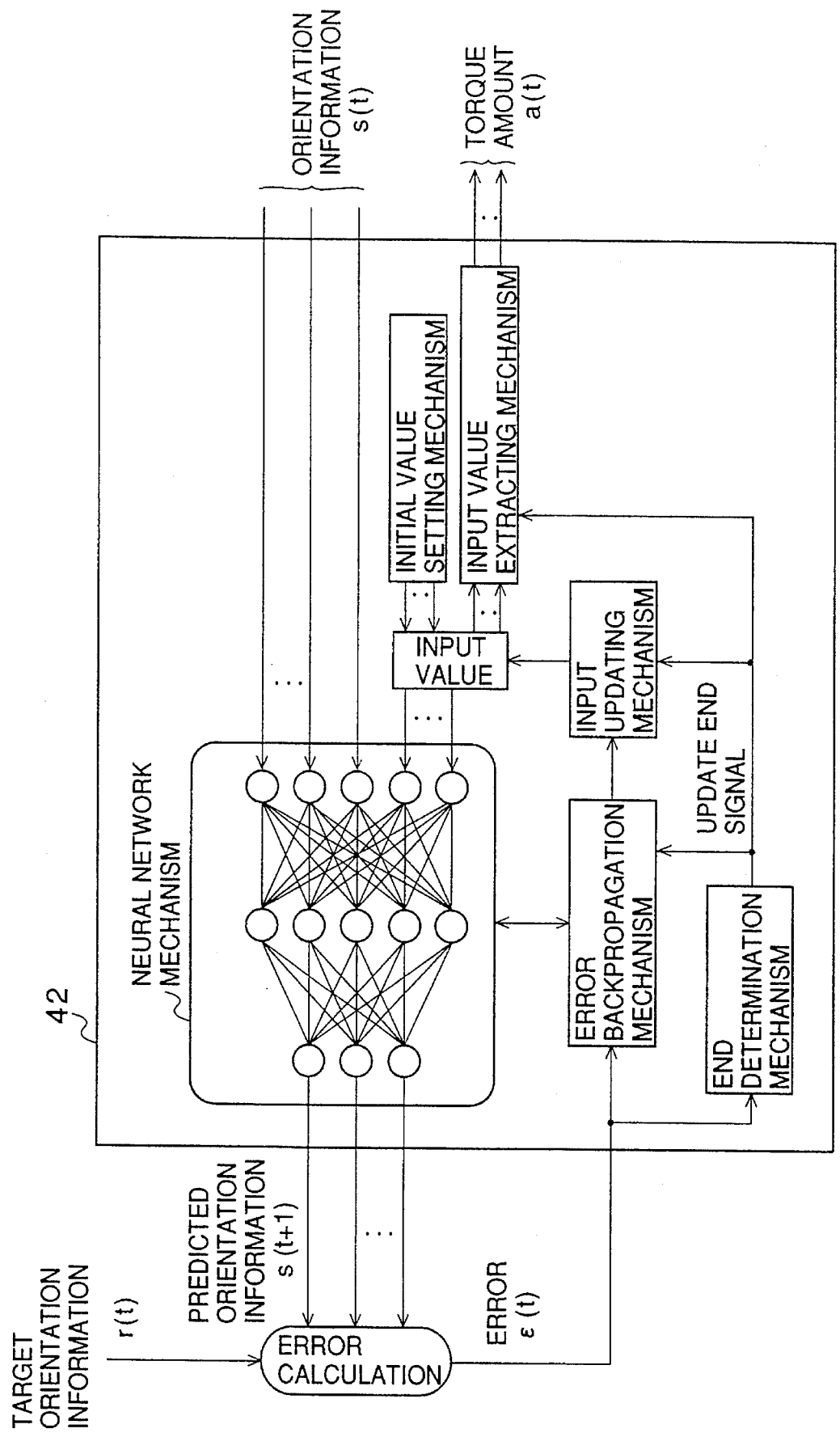
FIG. 24 is a diagram showing the detailed construction of a prediction neural network.

The orientation of the observed object output from the prediction neural network 42 is fed to the input of the recognition neural network 40. In correspondence with the prediction neural network 42, there is provided a mechanism for executing the aforementioned relaxation algorithm applied to the torque current input to the prediction neural network 42. According to this mechanism, the torque current to be applied to the actuator is updated so that the target orientation of the observed object and the orientation of the observed object output from the prediction neural network 42 match. FIG. 24 shows the detailed construction of the prediction neural network 42 including the relaxation algorithm executing mechanism.

A error detecting mechanism 43 calculates the difference between the target orientation of the observed object and the orientation of the observed object output from the prediction neural network 42. The relaxation algorithm executing mechanism provided in correspondence with the prediction neural network 42 updates the torque current fed to the actuator so that the error calculated by the error calculating mechanism 43 becomes small.

Figure 25:
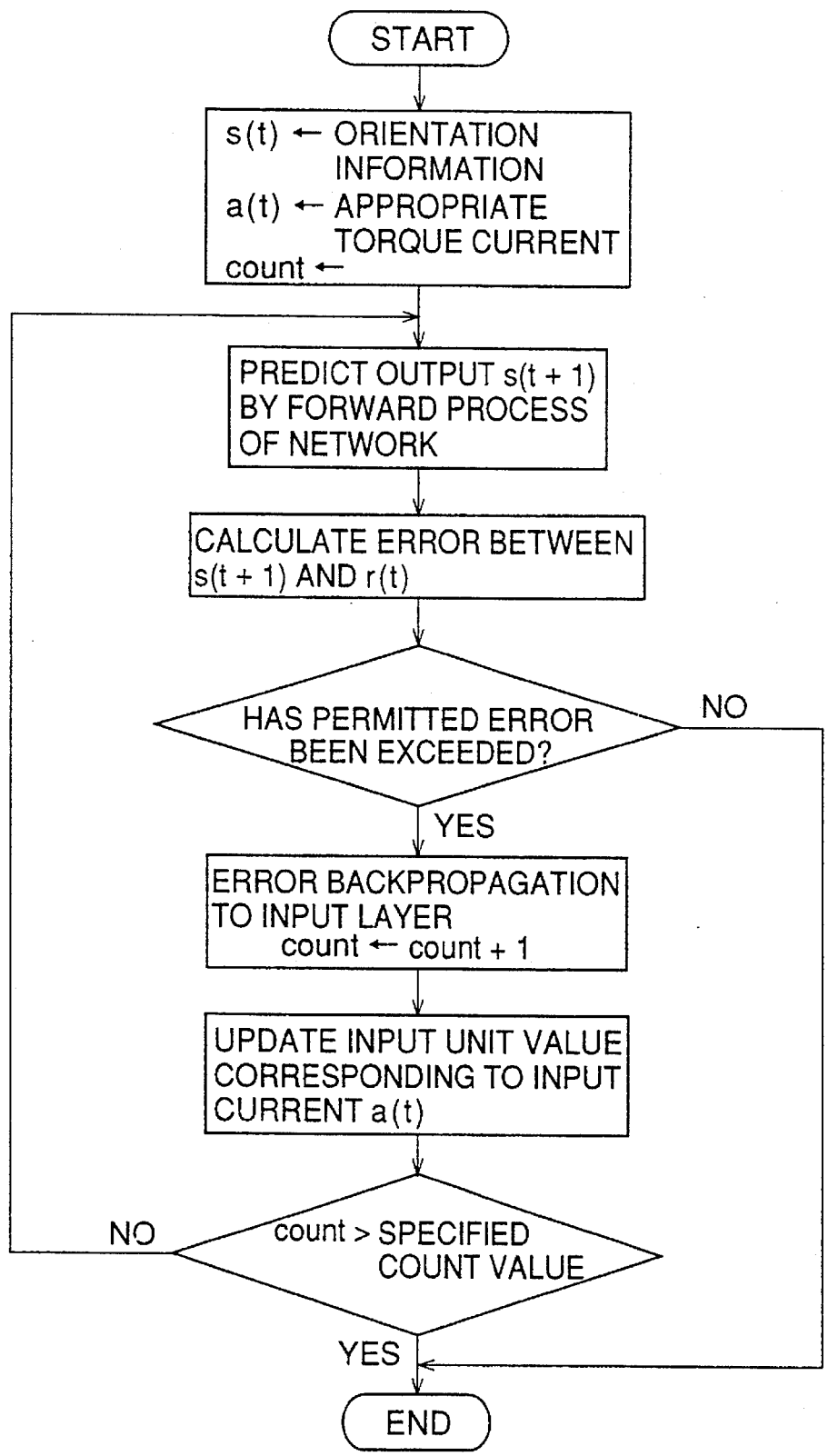
FIG. 25 is a flowchart showing an example of the process flow executed by the relaxation algorithm executing mechanism.

FIG. 25 shows an example of process flow executed by the relaxation algorithm executing mechanism provided in correspondence with the prediction network 42. Specifically, when the orientation information of the observed object output from the recognition neural network 40 and the appropriate initial value of the torque current are input to the prediction neural network 42, the executing mechanism obtains the error, using the error calculating mechanism 43, between the target orientation of the observed object and the orientation of the observed object output from the prediction neural network 42 and performs the process of obtaining the torque current which allows the obtained error to be smaller than the permitted error, by executing the relaxation algorithm using the error.

Figure 26:
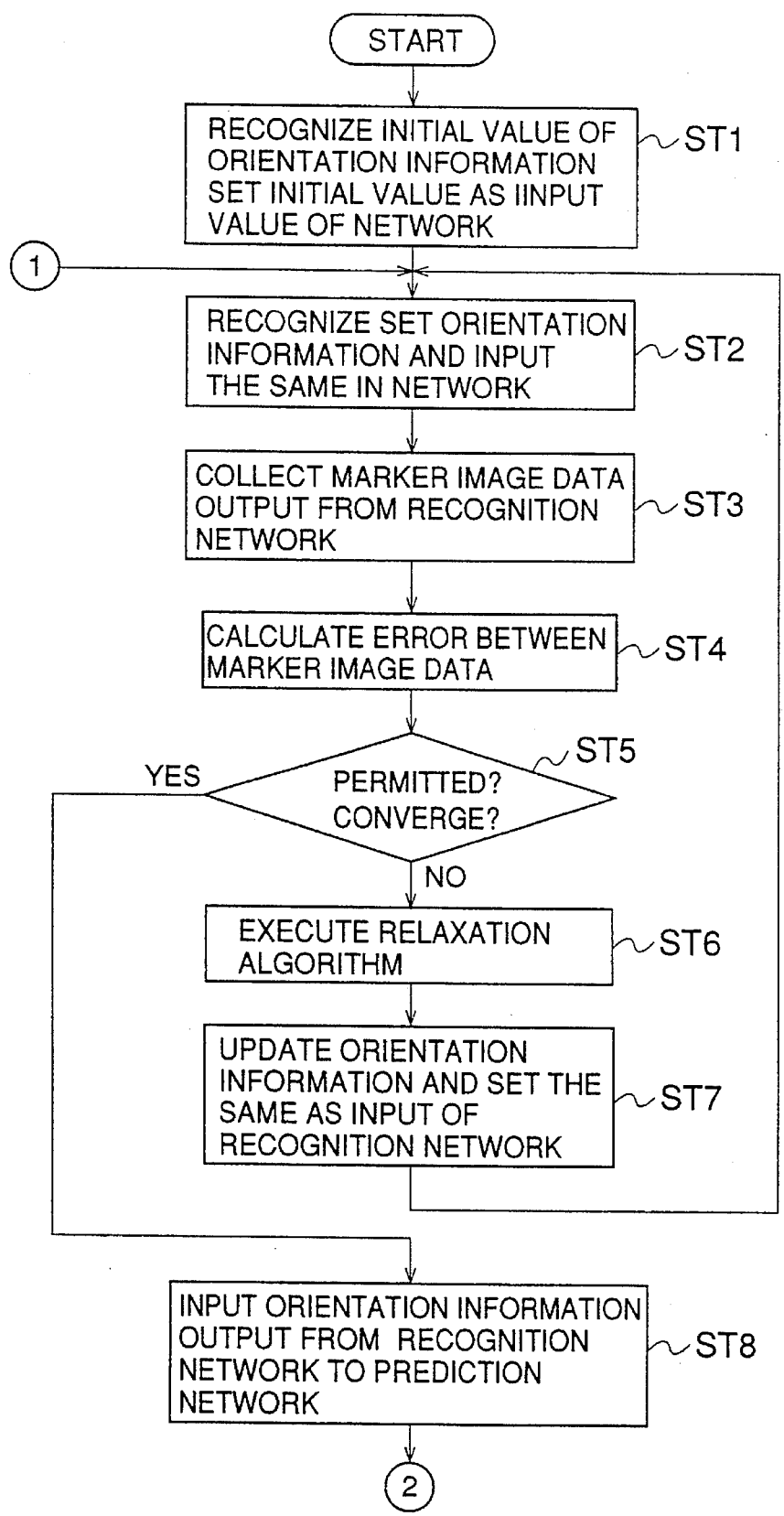
FIG. 26 is a flowchart showing an example of the process flow executed by the active sensing apparatus.
Figure 27:
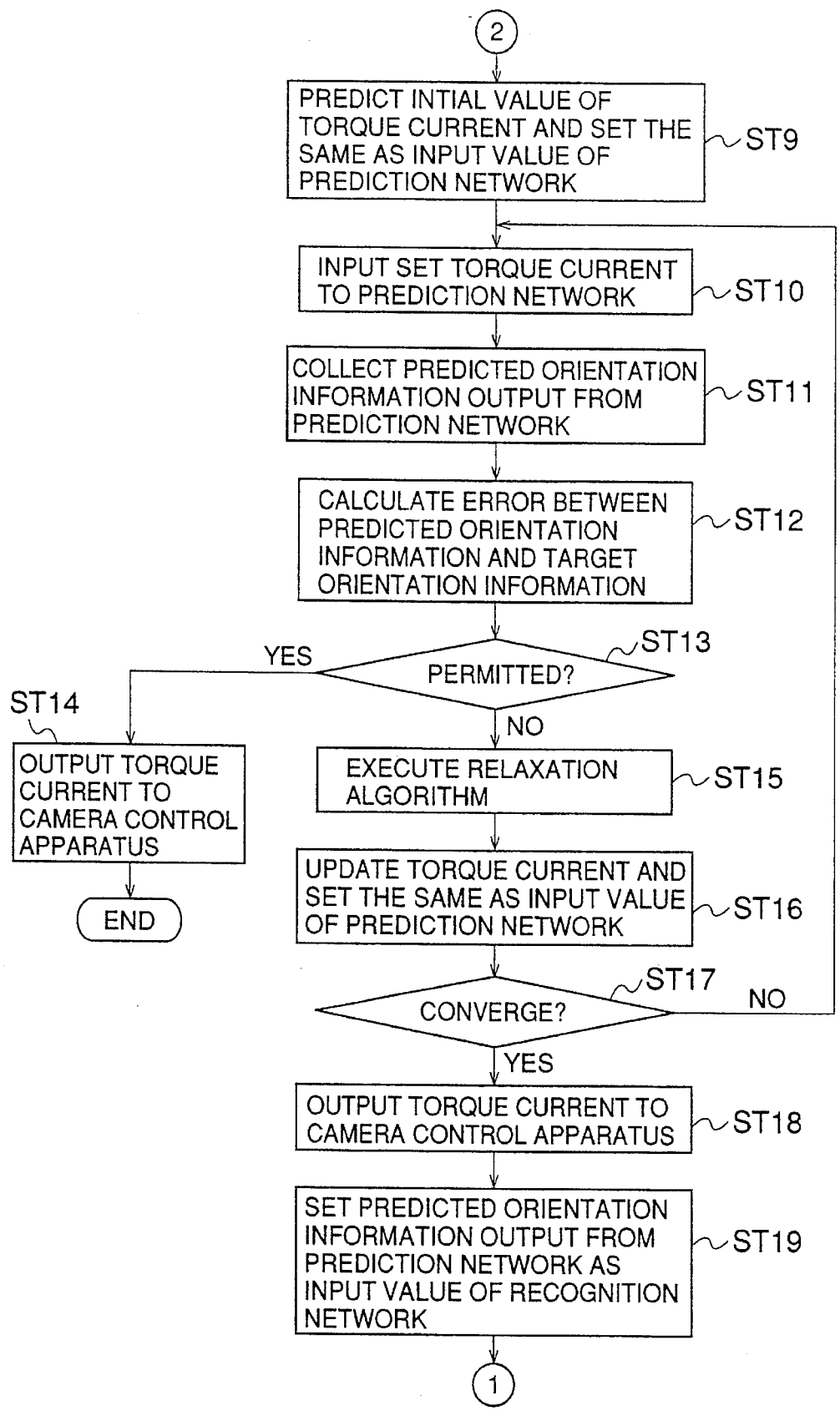
FIG. 27 is a flowchart showing an example of the process flow executed by the active sensing apparatus.

FIGS. 26 and 27 are examples of process flow executed by the active sensing apparatus 2 in which the construction shown in FIG. 22 is employed.

A description will next be given of the process flow.

As shown in the process flow of FIG. 26, when the orientation $(\Theta_o', \phi_o')$ of the observed object is given as the target value, the active sensing apparatus 2 sets the initial value of the orientation information as the input value of the recognition neural network 40 in step 1 so as to observe the object on the basis of the target orientation. Next, in step 2, the active sensing apparatus 2 inputs the orientation information set as the input value to the recognition neural network 40. Thereafter, in step 3, the active sensing apparatus 2 collects the marker image data output from the recognition neural network 40 in correspondence with the input process of step 2. In step 4, the active sensing apparatus 2 calculates the error, using the error calculating mechanism 43, between the marker image data collected in step 3 and the image data of the markers actually shot by the television camera.

Subsequently, in step 5, a determination is made as to whether or not the error calculated in step 4 is smaller than the permitted error, and, when the calculated error is greater than the permitted error, a determination is made as to whether or not the marker image data output from the recognition neural network 40 has converged. When it is determined in step 5 that the calculated error is greater than the permitted error and also the marker image data has not converged, the process proceeds to step 6. In step 6, by activating the aforementioned relaxation algorithm executing mechanism provided in correspondence with the recognition neural network 40, the relaxation algorithm is executed. Thereafter, in step 7, the orientation information input to the recognition neural network 40 in accordance with the execution result of the relaxation algorithm is updated. The updated orientation information is set as the input value of the recognition neural network 40. The process then returns to step 2.

If, while the steps 2 through 7 are repeated, it is determined in step 5 that the error calculated in step 4 is smaller than the permitted error, or if it is determined that the marker image data output from the recognition neural network 40 has converged, the process proceeds to step 8. In step 8, the orientation information output from the recognition neural network 40 is input to the prediction neural network 42.

Subsequently, the process proceeds to step 9 of the process flow shown in FIG. 27. In step 9, the initial value of the torque current output to the camera control apparatus is set, and the set torque current is set as the input value of the prediction neural network 42. Thereafter, in step 10, the torque current set as the input value is input to the prediction neural network 42. Thereafter, in step 11, the predicted orientation information output from the prediction neural network 42 in correspondence with the input process of steps 8 and 10 is collected.

Thereafter, in step 12, the error between the target orientation information of the observed object and the predicted orientation information collected in step 11 is calculated using the error calculating mechanism 43. In step 13, a determination is made as to whether or not the calculated error is smaller than the permitted error. When it is determined that the calculated error is smaller than the permitted error, it means that the observation of the object on the basis of the target orientation has been successfully carried out. The process proceeds to step 14, in which the torque current set as the input value of the prediction neural network 42 is output to the camera control apparatus, and the process ends. On the other hand, when the calculated error is greater than the permitted error, the process proceeds to step 15, in which the relaxation algorithm is executed by activating the aforementioned relaxation algorithm executing mechanism provided in correspondence with the prediction neural network 42. Thereafter, in step 16, the torque current input to the prediction neural network 42 in accordance with the execution result of the relaxation algorithm is updated, and the updated torque current is set as the input value of the prediction neural network 42.

Subsequently, in step 17, a determination is made as to whether or not the predicted orientation information output from the prediction neural network 42 has converged. When it is determined that it has not converged, the process returns to step 10, in which the control for approaching the target orientation is carried out. When it is determined in step 17 that the predicted orientation information output from the prediction neural network 42 has converged, the process proceeds to step 18, in which the torque current set as the input value of the prediction neural network 42 is output to the camera control apparatus. Subsequently, in step 19, the predicted orientation information output from the prediction neural network 42 is set as the input value of the recognition neural network 40, and the process returns to step 2 of the process flow shown in FIG. 26, whereupon the control for attaining the target orientation is carried out.

As has been described, by employing the active sensing apparatus 2 of the present invention, active sensing whereby recognition and action are executed in a parallel and coordinated manner can be realized. The prediction information for predicting the recognition result occurring as a result of an action is utilized so that the action for realizing the obtaining of the target recognition result is generated. Hence, it is possible to improve the recognition rate and the recognition speed.

A description will now be given of a simulation by which the usefulness of the active sensing apparatus 2 of the present invention as applied to the observation system illustrated in FIG. 21 was examined.

The apparatus construction shown in FIG. 22 was employed in the active sensing apparatus 2 used in the simulation. I order to simplify the simulation, a prediction control function as indicated below, instead of the prediction neural network 42, was included in the apparatus, $$\Theta_s(t+1)=\Theta_s(t)+\Delta\Theta_a$$

$$\phi_s(t+1)=\phi_s(t)+\Delta\phi_a$$

The learning of the weight of the recognition neural network 40 was carried out by seventy-two kinds of learning signal generated when sample values $\Theta_0$ and $\phi_0$ of the pairs of values ($\Theta_0$, $\phi_0$) were set at 30-degree intervals. The recognition of the orientation of the arm tip was determined accurate when the error is smaller than 3.75 degrees.

Figure 28A:
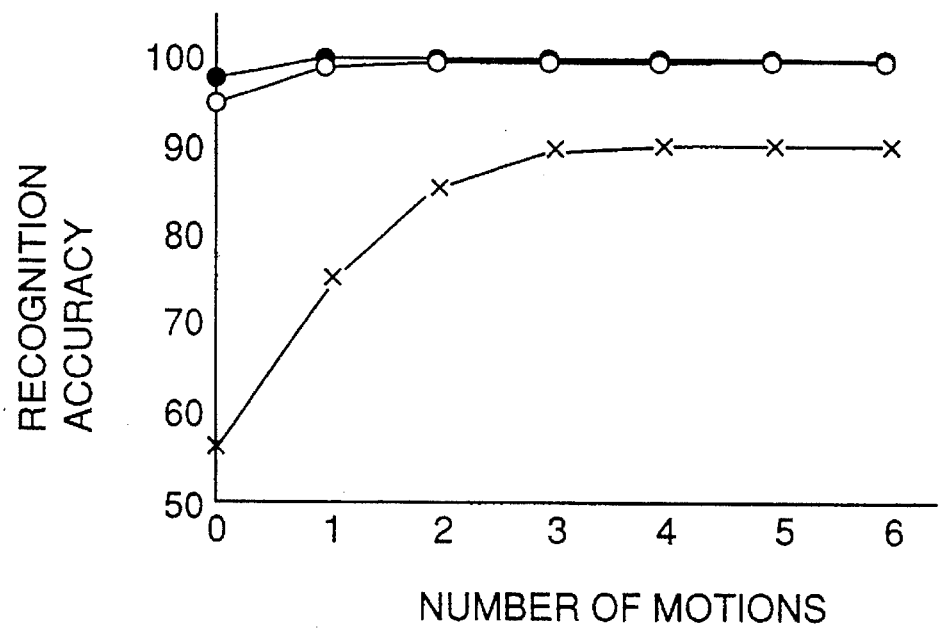
FIG. 28A is a graph showing simulation data.
Figure 28B:
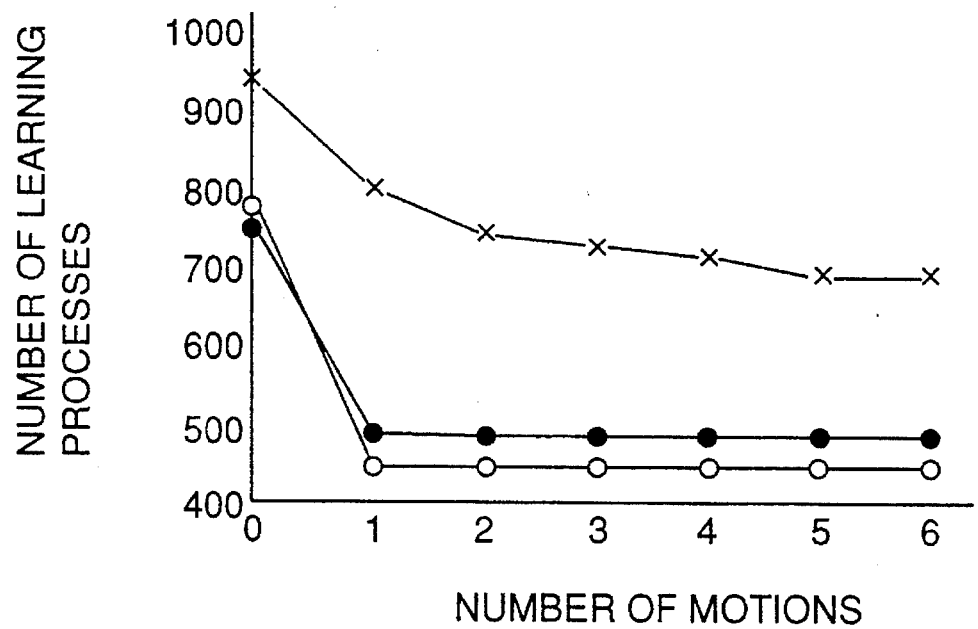
FIG. 28B is a graph showing simulation data.

In the simulation data shown in FIG. 28A, the number of motions is plotted horizontally, and the recognition rate is plotted vertically. In the simulation data shown in FIG. 28B, the number of motions is plotted horizontally, and the number of learning process of the relaxation algorithm is plotted vertically. In the figures, "○" indicates the result when a learning signal in the simulation data obtained at 7.5-degree intervals was utilized. "●" indicates the result when a learning signal in the simulation data obtained at 7.5-degree intervals was not utilized. "x" indicates the result when one of the four markers is masked.

As can be seen from this simulation results, it is possible to realize an accurate recognition with a significantly small number of motions, by using the active sensing apparatus 2 of the present invention. It is also possible to realize a significantly high recognition rate even when the observed object is in an uncertain state.

The present invention is not limited to the above described embodiments, and variations and modifications may be made without departing from the scope of the present invention.

What is claimed is:

1. A control apparatus by which an actuation amount required in controlling a control amount of a controlled object to match a target control amount is determined, said control apparatus comprising:

a converting part which is constructed to map the correspondence between an actuation amount indicated by the controlled target and a control amount, and which receives an input of the actuation amount so as to output a control amount corresponding to said input, wherein the converting part comprises a layer neural network including an input layer and output layer, wherein an error occurring between a target joint position and a current joint position is computed in the output layer and the error is propagated to the input layer so as to output the control amount;

a calculating part which, when an initial actuation amount is input to said converting part, calculates a corrective actuation amount corresponding to said initial actuation amount and allowing the target control amount to match the control amount output from said converting part, on the basis of a difference between the target control amount and the control amount output from said converting part; and an outputting part which outputs a sum of the initial actuation amount and the corrective actuation amount calculated by said calculating part, as the actuation amount to be fed to the controlled target, wherein the actuation amount is used to control the controlled object.

2. The control apparatus as claimed in claim 1, wherein the calculating part calculates the corrective actuation amount while applying a restriction to at least one of a plurality of actuation amounts input to the converting part, each actuation amount being associated with an actuated parameter of the control target.

3. The control apparatus as claimed in claim 1, wherein the calculating part uses the corrective actuation amount permitted according to said restriction as the calculated corrective actuation amount, when the corrective actuation amount that allows the control amount to match the target control amount cannot be obtained.

4. The control apparatus as claimed in claim 3, wherein the actuation amount previously output from the outputting part is used as the initial actuation amount input to the converting part.

5. The control apparatus as claimed in claim 1, wherein the calculating part calculates the corrective actuation amount in accordance with the relaxation algorithm.

6. The control apparatus as claimed in claim 1, wherein the calculating part performs calculations of the corrective actuation amount using some of a plurality of actuation amounts input to the converting part, each actuation amount being associated with an actuated parameter of the controlled target.

7. A control apparatus by which an actuation amount required in controlling a control amount of a controlled object to match a target control amount is obtained, said control apparatus comprising:

a converting part which is constructed to map the correspondence between an actuation amount/a state amount indicated by the controlled target and a control amount, and which receives an input of the actuation amount/the state amount so as to output a control amount corresponding to said input, wherein the converting part comprises a neural network including an input layer and output layer, wherein an error occurring between a target joint position and a current joint position is computed in the output layer and the error is propagated to the input layer so as to output the control amount;

a calculating part which, when an initial actuation amount and the state amount of the controlled target is input to said converting part, calculates a corrective actuation amount corresponding to said initial actuation amount and allowing the target control amount to match the control amount output from said converting part, on the basis of a difference between the target control amount and the control amount output from said converting part; and an outputting part which outputs a sum of the initial actuation amount and the corrective actuation amount calculated by said calculating part, as the actuation amount to be fed to the controlled target, wherein the actuation amount is used to control the controlled object.

* * * * *